United States Patent
Ellis et al.

(10) Patent No.: US 10,259,167 B2
(45) Date of Patent: Apr. 16, 2019

(54) METHODS AND APPARATUS FOR AFFIXING HARDWARE TO GARMENTS

(71) Applicant: Cohaesive Garment Technology Inc., Pemberton (CA)

(72) Inventors: Shane Michael Ellis, Bellevue, WA (US); Tom Routh, Pemberton (CA); Susanna Bergström, Pemberton (CA)

(73) Assignee: Cohaesive Garment Technology Inc., Pemberton (CA)

( * ) Notice: Subject to any disclaimer, the term of this patent is extended or adjusted under 35 U.S.C. 154(b) by 345 days.

(21) Appl. No.: 15/000,691

(22) Filed: Jan. 19, 2016

(65) Prior Publication Data
US 2016/0221252 A1 Aug. 4, 2016

Related U.S. Application Data

(63) Continuation of application No. 13/318,314, filed as application No. PCT/CA2010/000615 on Apr. 28, 2010, now Pat. No. 9,265,294.
(Continued)

(51) Int. Cl.
B29C 65/48 (2006.01)
B29C 65/02 (2006.01)
(Continued)

(52) U.S. Cl.
CPC ............. *B29C 65/48* (2013.01); *A41D 1/002* (2013.01); *A41D 27/00* (2013.01); *A41H 37/001* (2013.01); *A41H 43/04* (2013.01); *B29C 65/02* (2013.01)

(58) Field of Classification Search
CPC ...... A41H 43/04; A41H 37/00; A41H 37/001; A41H 37/003
(Continued)

(56) References Cited

U.S. PATENT DOCUMENTS 2,743,761 A 5/1956 Snyder et al.
2,745,160 A 5/1956 Jones
(Continued)

FOREIGN PATENT DOCUMENTS

WO 02032665 A1 4/2002

OTHER PUBLICATIONS http://www.sweetprotection.com/snow/technical-clothing/mens/jackets/?p=crusader-jacket&pid=308—website featuring jacket disclosed at ISPO Tradeshow, Munich, Germany Feb. 2010.

*Primary Examiner* — Scott W Dodds
(74) *Attorney, Agent, or Firm* — Todd A. Rattray; Oyen Wiggs Green & Mutala LLP

(57) ABSTRACT

Methods and apparatus are provided for affixing hardware components to garments. Hardware components are provided with an operative component and an adhesive surface. The operative component interacts with one or more other operative components and/or with one or more other features of the garment (e.g. with cords, straps or the like connected to the garment and/or with the fabric of the garment) and/or with one or more external devices. The adhesive surface is bonded to a corresponding interior surface of a fabric layer of the garment using an adhesive located between the adhesive surface and the corresponding surface of the fabric layer. The hardware component is projected from an interior of the fabric layer, through an aperture defined by the fabric layer, and to an exterior of the fabric layer.

22 Claims, 16 Drawing Sheets

Related U.S. Application Data

(60) Provisional application No. 61/178,576, filed on May 15, 2009.

(51) Int. Cl.
*A41H 37/00* (2006.01)
*A41H 43/04* (2006.01)
*A41D 1/00* (2018.01)
*A41D 27/00* (2006.01)

(58) Field of Classification Search
USPC .................................................. 156/66, 293
See application file for complete search history.

(56) References Cited

U.S. PATENT DOCUMENTS

| | | | |
|---|---|---|---|
| 2,884,647 A * | 5/1959 | Cuttler | A41F 9/002 156/66 |
| 3,620,402 A | 11/1971 | Wentland | |
| 3,751,176 A | 8/1973 | Von Hollen | |
| 3,816,211 A | 6/1974 | Haigh | |
| 3,890,679 A | 6/1975 | Simon | |
| 4,012,277 A | 3/1977 | Lundskow et al. | |
| 4,327,470 A | 5/1982 | Lawrence | |
| 4,453,292 A | 6/1984 | Bakker | |
| 4,539,735 A | 9/1985 | Kasai | |
| 4,698,905 A * | 10/1987 | Taga | A41H 37/00 29/432 |
| 4,962,875 A | 10/1990 | Sodeno | |
| 5,079,809 A | 1/1992 | Teich et al. | |
| 5,258,210 A | 11/1993 | Chalfin | |
| 5,261,997 A | 11/1993 | Inselmann | |
| 5,263,202 A | 11/1993 | Siberell | |
| 5,326,632 A | 7/1994 | Zenda et al. | |
| 6,654,963 B2 | 12/2003 | Fayle et al. | |
| 6,658,704 B2 | 12/2003 | Buscart | |
| 7,254,871 B2 | 8/2007 | Yoshiguchi | |
| 7,258,762 B2 | 8/2007 | Fowler | |
| 2005/0072335 A1 * | 4/2005 | Zhang | C09D 119/006 106/285 |
| 2006/0148351 A1 | 7/2006 | Tao et al. | |
| 2006/0283907 A1 | 12/2006 | Green et al. | |
| 2007/0044280 A1 | 3/2007 | Chang | |
| 2007/0149657 A1 | 6/2007 | Skuratowicz et al. | |
| 2009/0120564 A1 * | 5/2009 | Halope | G06K 19/07749 156/219 |

* cited by examiner

FIG. 7
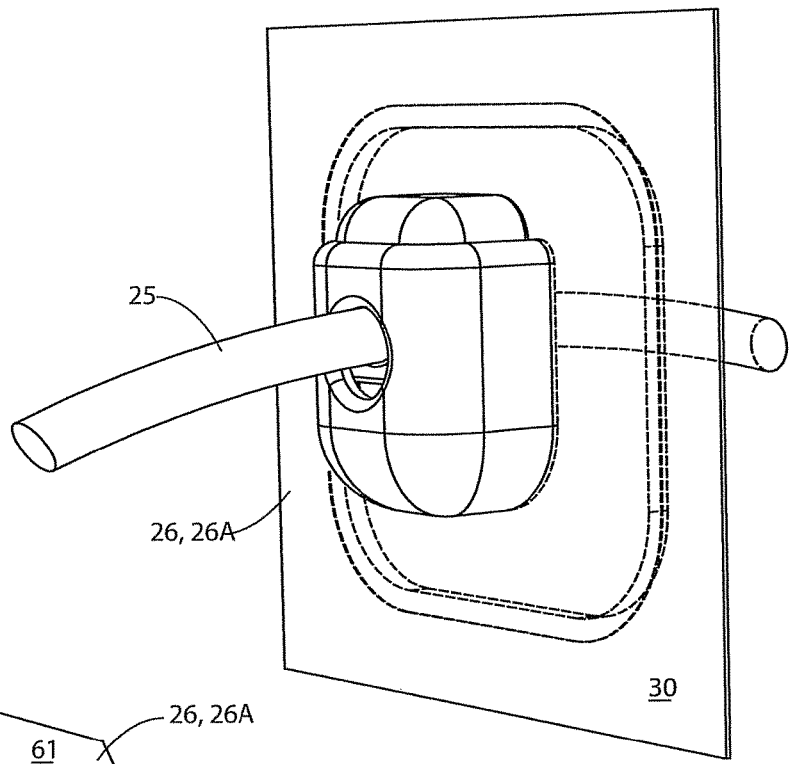
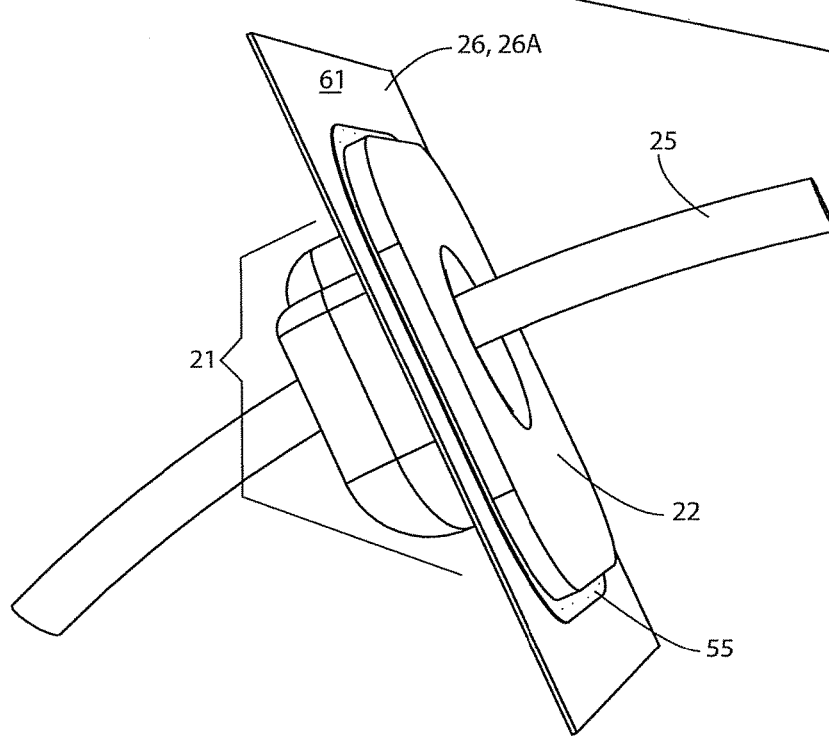
FIG. 8

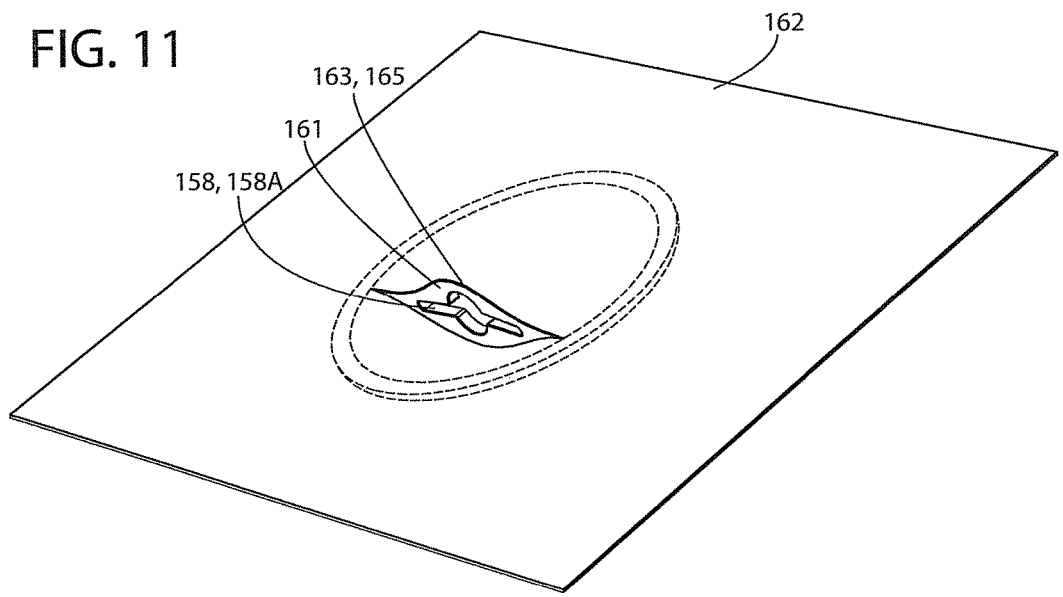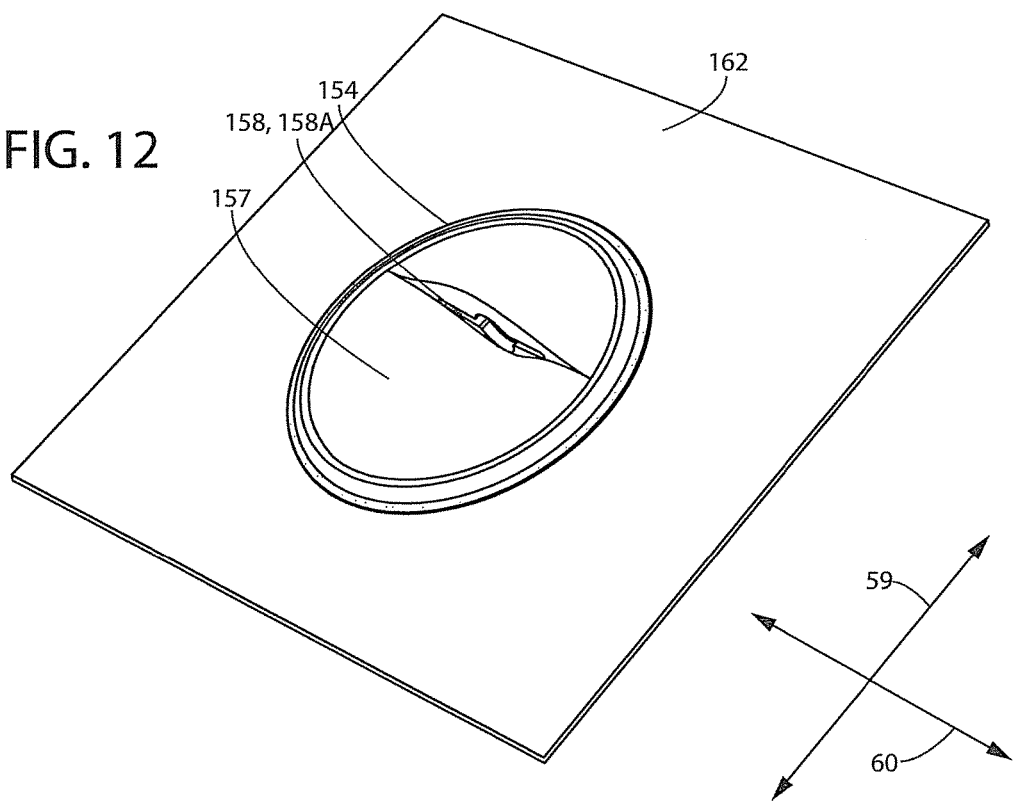

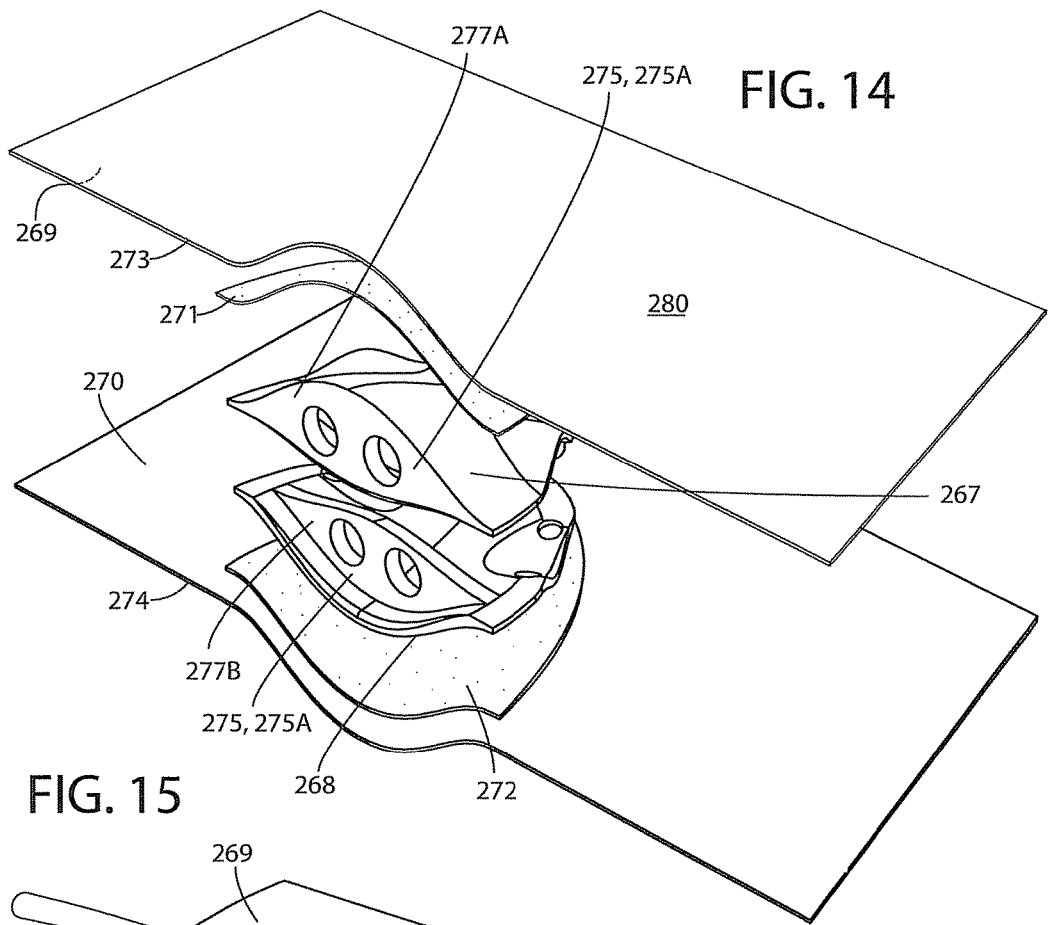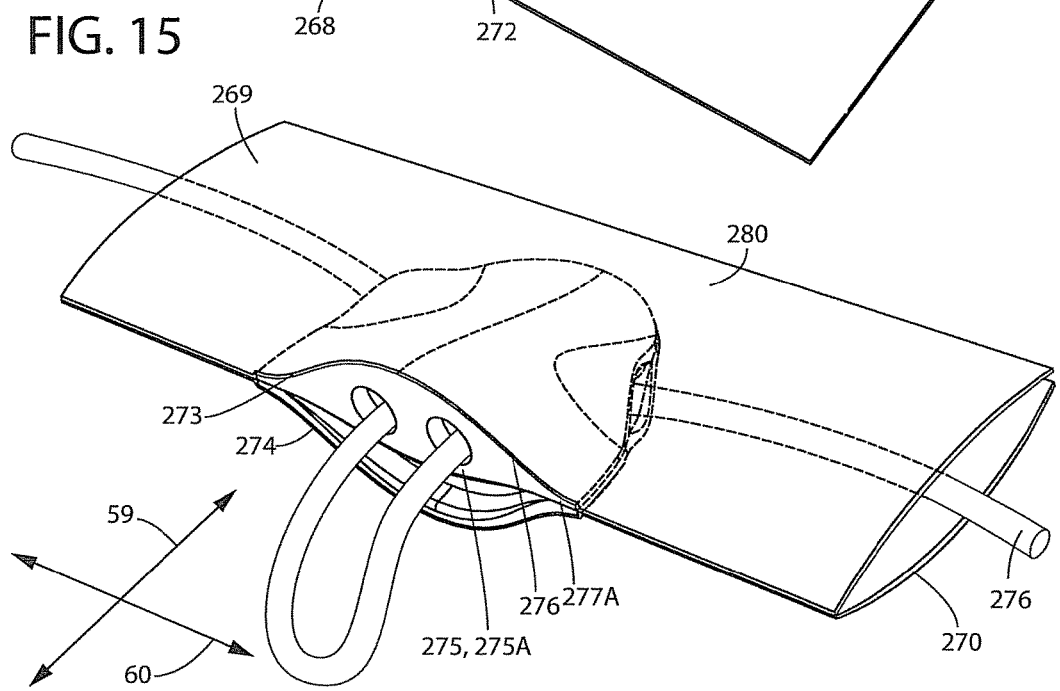

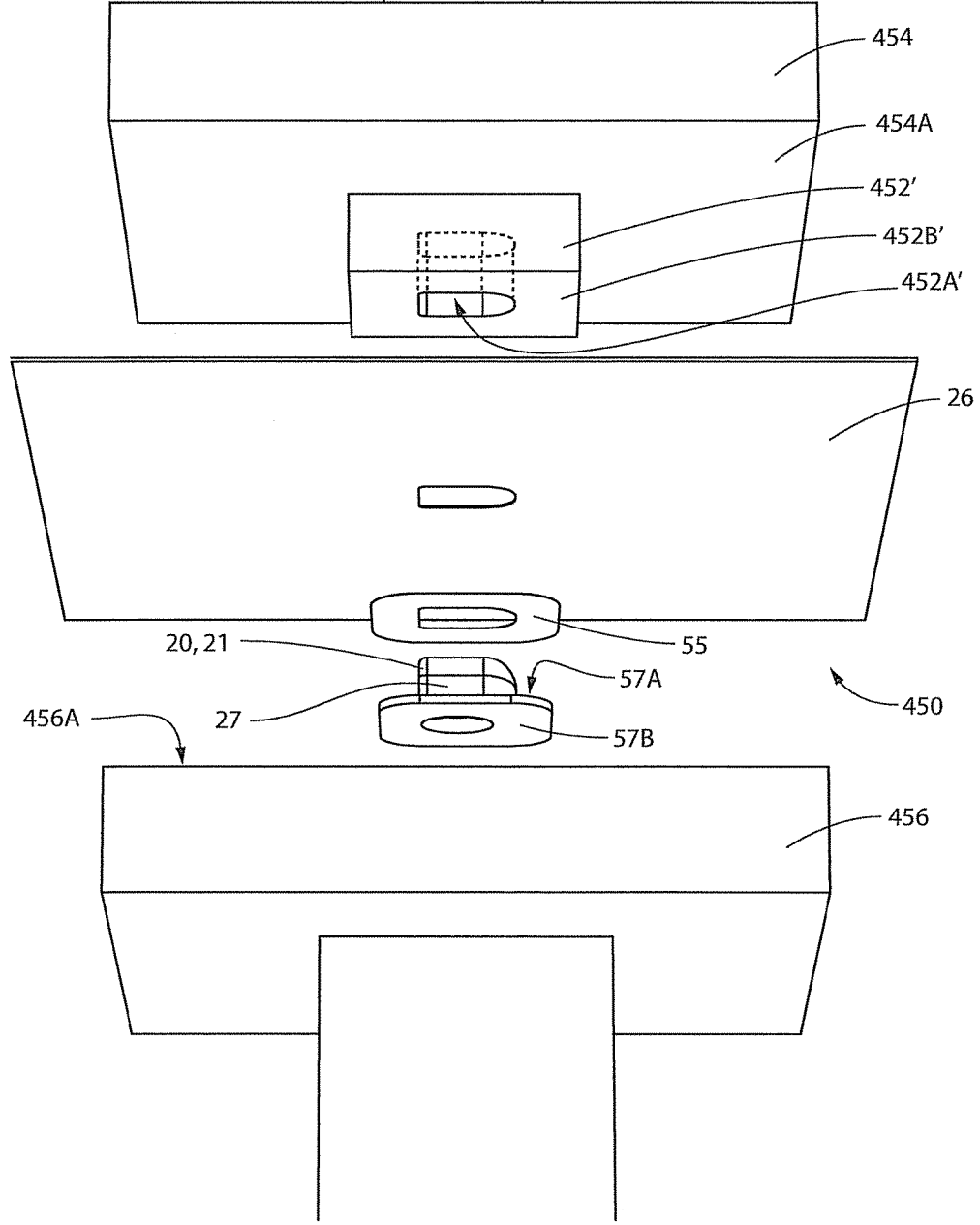

METHODS AND APPARATUS FOR AFFIXING HARDWARE TO GARMENTS

RELATED APPLICATIONS

This application is a continuation of U.S. application Ser. No. 13/318,314 which is a national phase application having a 35 USC 371 date of 31 Oct. 2011. U.S. application Ser. No. 13/318,314 is a national phase application corresponding to PCT application No. PCT/CA2010/000615 having an international filing date of 28 Apr. 2010. PCT application No. PCT/CA2010/000615 in turn claims priority from (and the benefit under 35 USC 119(e) of) U.S. application No. 61/178,576 filed 15 May 2009. Each of U.S. application Ser. No. 13/318,314, PCT application No. PCT/CA2010/000615 and U.S. application No. 61/178,576 are hereby incorporated herein by reference.

FIELD OF INVENTION

The technology described herein relates to garments, particularly outdoor/technical garments. Particular embodiments provide methods and apparatus for affixing hardware to garments.

BACKGROUND OF INVENTION

Garments, and outdoor/technical garments in particular, may incorporate a wide range of hardware in their construction. In the context of outdoor/technical garments, such hardware typically performs some sort of desired function. Performance of such functions is typically accomplished by an operative component of the hardware which interacts with one or more other operative components, with the garment itself (e.g. with the fabric of the garment), with one or more other features of the garment (e.g. with cords, straps or the like connected to the garment) and/or with one or more external devices. Non-limiting examples of operative components of functional hardware used for outdoor/technical garments include: cord locks and cord management devices (which typically interact with a cord incorporated into the garment—e.g. to control the tightness of a drawstring or the like); buckles, clips, magnets and other closure mechanisms; covers (e.g. zipper garages); ladder locks; reflectors; branding components and/or the like. It is desirable in many cases for these operative components to be securely fastened to the garment to facilitate, or to increase the effectiveness of, their functionality and/or to minimize the potential for damaging the garment through use of the operative component.

One of the most common operative hardware components incorporated into outdoor/technical garments is the cord lock or cord management device. To improve the fit of a garment, multiple drawstrings can be incorporated into the construction of the garment (around the hood, waist and/or sleeve openings, for example). These drawstrings in conjunction with cord lock/management device permit the wearer to adjust the fit of the garment in certain areas (hood, waist, sleeves, etc.). For the cord lock/management device to function effectively (e.g. for the user to adjust the drawstring with a single hand), it is desirable that the cord lock be securely fastened to the garment, so that it stays stationary when the drawstring is pulled/tensioned.

The prior art discloses a number of techniques for fastening hardware components to garments. Examples of such prior art techniques are disclosed in: US patent publication No. 2006/0283907; U.S. Pat. Nos. 6,658,704; 7,254,871; 5,263,202; 6,654,963; 7,258,762; US patent publication No. 2007/0044280; and U.S. Pat. No. 4,453,292.

The hardware fastening techniques evolved in the prior art have a number of drawbacks including, without limitation:
- the hardware dangles from the garment and is prone to being snagged;
- the hardware appears aesthetically to have been added to the garment as somewhat of an afterthought, which reduces the marketability of the garment; and
- the holes created in the fabric from the sewing needle used to fasten the hardware to the garment permit moisture to enter the garment. Accordingly, for waterproof garments, it becomes necessary to seal such holes with a patch or tape or the like. The added step of sealing requires extra manufacturing time and cost. Such sealing also decreases the breathability of the garment (e.g. its ability to vent moisture from within the garment to the exterior of the garment), as the waterproof tape and/or patches are typically not breathable.

There is a general desire for improved techniques for mounting hardware components to garments. Such techniques may overcome or ameliorate some of the aforementioned issues with the prior art.

SUMMARY

Methods and apparatus are provided for fastening operative hardware components to garments in manners which are more integrated, stronger and more waterproof than prior art techniques. The methods and apparatus described herein are suitable for use with a wide range of operative components. Apparatus according to particular aspects of the invention comprise include one or more adhesive surface(s) (also referred to as glue surface(s)) which have relatively large transverse dimensions (in comparison to the transverse dimensions of their respective operative components). The apparatus may be affixed to the fabric of garments by adhesive bonding between the fabric and the adhesive surface(s).

Adhesive bonding may be achieved through the use of adhesive material(s) such as glues or glue-containing compounds. In particular embodiments, apparatus can be bonded to internal fabric surfaces of garments, to external fabric surfaces of garments and/or between fabric layers of garments. Various methods are provided for the affixation of various hardware components to internal fabric surfaces of garments, to external fabric surfaces of garments and/or between fabric layers of garments.

One aspect of the invention provides a method for attaching a hardware component to a garment. The method involves: providing a garment comprising a layer of fabric; providing the hardware component with an operative component and an adhesive surface; and bonding the adhesive surface to a corresponding surface of the fabric layer using an adhesive located between the adhesive surface and the corresponding surface of the fabric layer.

Another aspect of the invention provides a garment comprising: a fabric layer; one or more hardware components adhesively bonded to the fabric layer, each hardware component comprising: an operative component for interacting with one or more of: another operative component located on the garment; another feature of the garment; and an external device; and an adhesive surface bonded to a surface of the fabric layer using an adhesive between the adhesive surface and the fabric layer.

Another aspect of the invention provides a hardware component for adhesively bonding to a fabric surface of a garment, the hardware component comprising: an operative component for interacting with one or more of: another operative component located on the garment; another feature of the garment; and an external device; and an adhesive surface adapted for use in bonding the adhesive surface to the fabric surface using an adhesive located between the adhesive surface and the fabric surface.

Further aspects and specific features of the invention will be understood with reference to the following description and accompanying drawings.

BRIEF DESCRIPTION OF DRAWINGS

In drawings, which illustrate non-limiting embodiments of the invention:

FIG. 7 is a perspective view of the FIG. 1 apparatus affixed to the internal surface of the fabric of a garment according to a particular embodiment, with a cord installed in the operative cord-lock component;

FIG. 8 is a perspective view of the FIG. 7 apparatus from a different view;

FIG. 11 is a front perspective view of the FIG. 9 apparatus attached to the internal surface of the fabric of a garment according to a particular embodiment;

FIG. 12 is a rear perspective view of the FIG. 9 apparatus attached to the internal surface of the fabric of a garment according to a particular embodiment;

FIG. 14 is an exploded perspective view of the FIG. 13 apparatus, illustrating a method by which the apparatus may be affixed between a pair of internal fabric surfaces of a garment in accordance with a particular embodiment;

FIG. 15 is a perspective view of the FIG. 13 apparatus installed between a pair of internal fabric surfaces of a garment in accordance with a particular embodiment, with a cord installed in the operative cord-lock component;

FIG. 22 shows a schematic exploded view of the use of a heat press incorporating a component retainer according to a particular embodiment suitable for use with the apparatus of FIGS. 1-3 when such apparatus is being bonded to a fabric surface in accordance with the embodiment of FIGS. 6-8.

DETAILED DESCRIPTION

Figure 1:
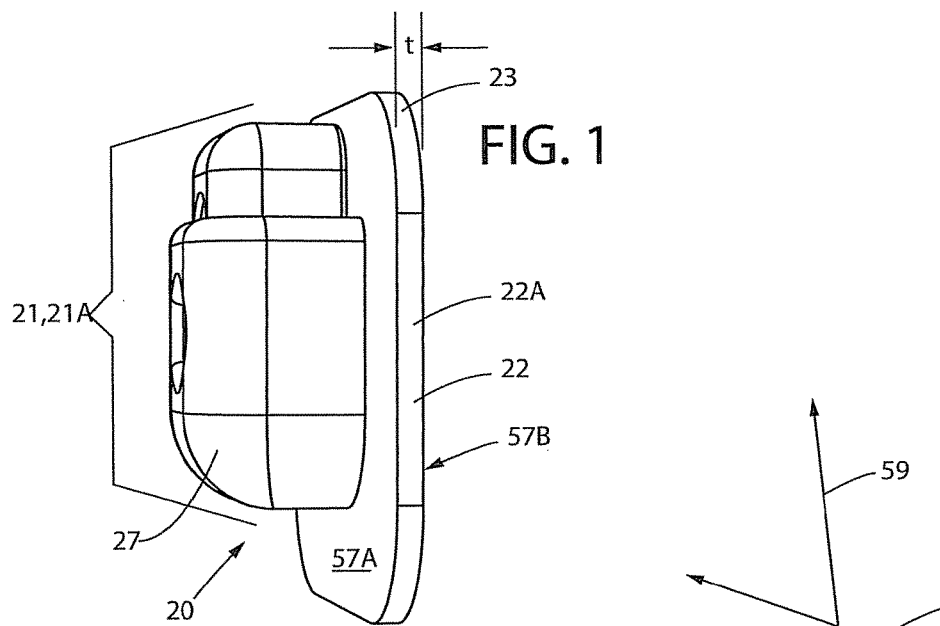
FIG. 1 is a perspective view of an apparatus for mounting a hardware component to a garment according to a particular embodiment.
Figure 2:
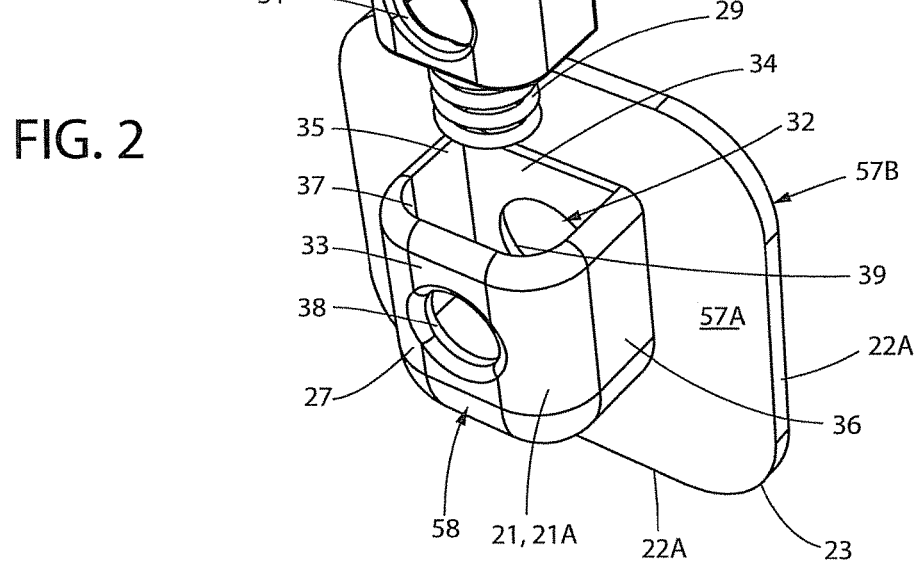
FIG. 2 is an exploded perspective view of the FIG. 1 apparatus.
Figure 3:
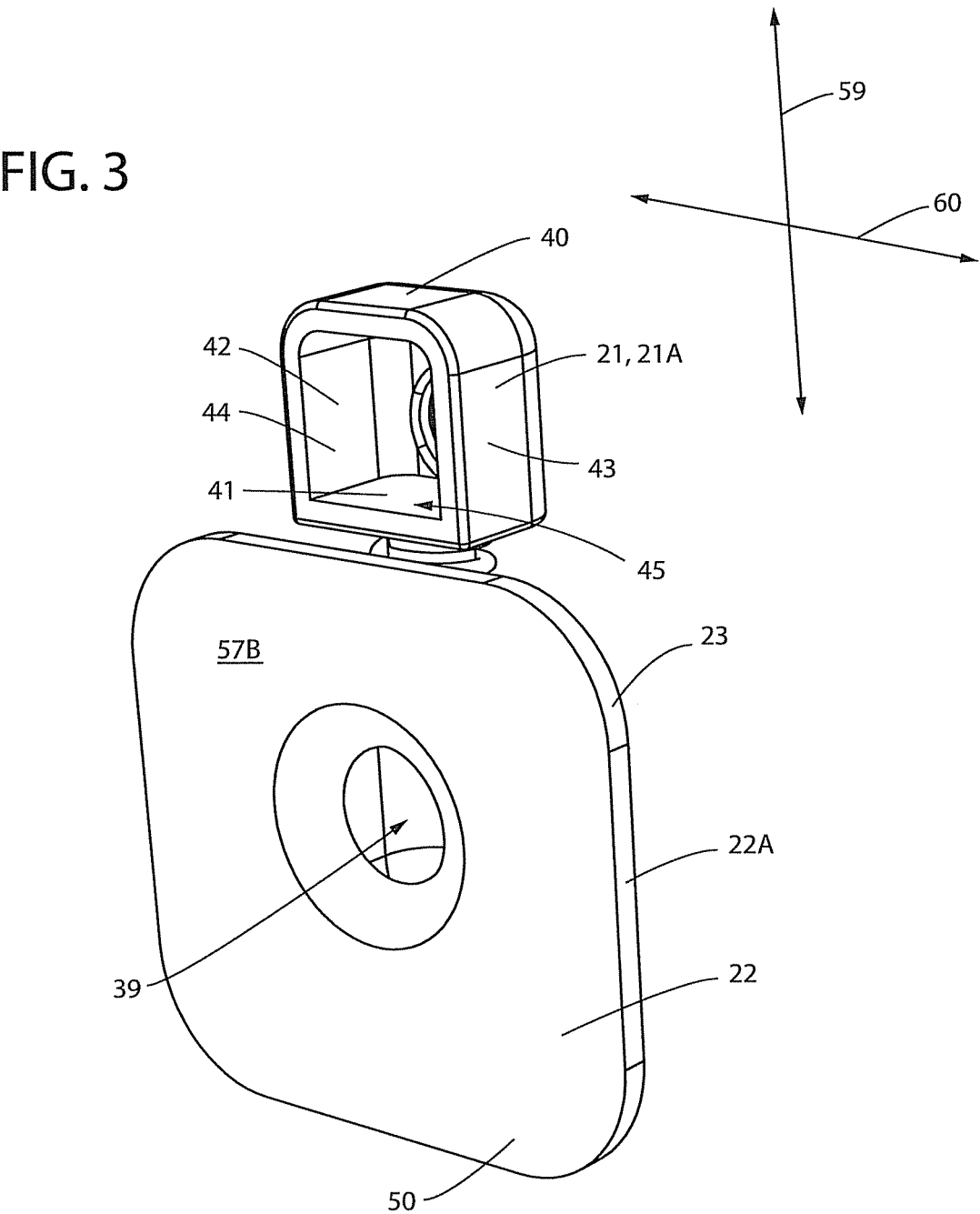
FIG. 3 is an exploded perspective view of the FIG. 1 apparatus, illustrating the back of the apparatus

Before the embodiments of the invention are explained in detail, it is to be understood that the invention is not limited in its application to the details of construction and the arrangements of the operative components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including" and "comprising", and variations thereof, is meant to encompass the items listed thereafter and equivalents thereof. Unless otherwise specifically stated, it is to be understood that steps in the methods described herein can be performed in varying sequences.

As will be described in more detail below, aspects of the invention provide hardware apparatus and methods for affixing such apparatus to garments by means of adhesive bonding. The apparatus comprise an operative component and an adhesive surface suitable for being adhesively bonded to fabric. Adhesive material is provided between the adhesive surface and the fabric. Adhesive surfaces may be generally flat. Adhesive surfaces may comprise a variety of other surfaces which make them suitable for adhesive bonding and in particular adhesively bonding to the fabric of garments. Apparatus according to various embodiments of the invention may comprise a number of different types of operative components which may interact with one or more other operative components, with the garment itself (e.g. with the fabric of the garment), with one or more other features of the garment (e.g. with cords, straps or the like connected to the garment) and/or with one or more external devices to perform some corresponding function. While the operative components of the illustrated embodiments described herein comprise cord locks, this is not necessary. In other embodiments, operative components may include other types of functional components for which it is desired to affix the components to the fabric of a garment, including without limitation:

- cord locks and cord management devices (which typically interact with a cord incorporated into or projecting through the garment and at least one component of the cord lock—e.g. to control the tightness of a drawstring or the like);
- buckles, clips, magnets and other closure mechanisms and/or attachment mechanisms for attaching other devices (e.g. electronic devices) to a garment;
- zippers and zipper garages (for covering the small holes left at the edge(s) of a zipper even when the zippers are closed) and other covers (e.g. weather proofing covers) for various openings in the garment;
- ladder locks which may be used in conjunction with straps (e.g. nylon webbing or the like) such that the strap is threaded through the ladder lock and, usually but not necessarily, doubled back, such that the end of the strap may be pulled through the ladder lock when the ladder lock is in an adjustment configuration and the strap is prevented from being pulled through the ladder lock when the ladder lock is in a locking configuration;
- garment mounted transponders (also known informally as reflectors), such as the avalanche safety reflector sold by Recco AB of Sweden under the brand name RECCO™ or the like;
- other types of electronic components or devices for interfacing with electronic components (e.g. buttons, processors, transmitters, speakers, microphones or the like) and enclosures or casings for housing such electronic components or devices;
- branding components; and/or
- the like.

Figure 4:
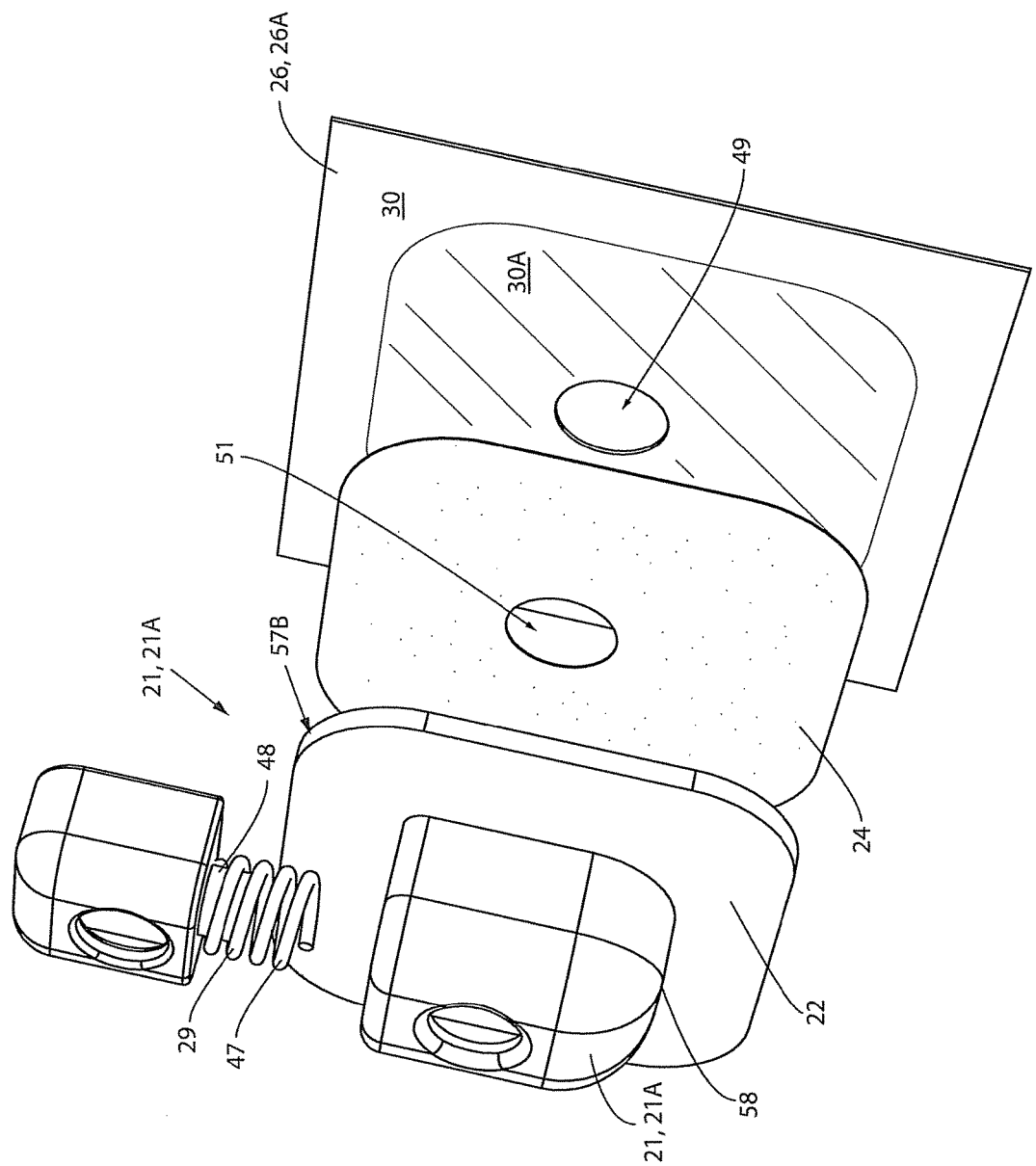
FIG. 4 is an exploded perspective view of the FIG. 1 apparatus, illustrating a method by which the apparatus may be affixed to the external surface of the fabric of a garment according to a particular embodiment.
Figure 5:
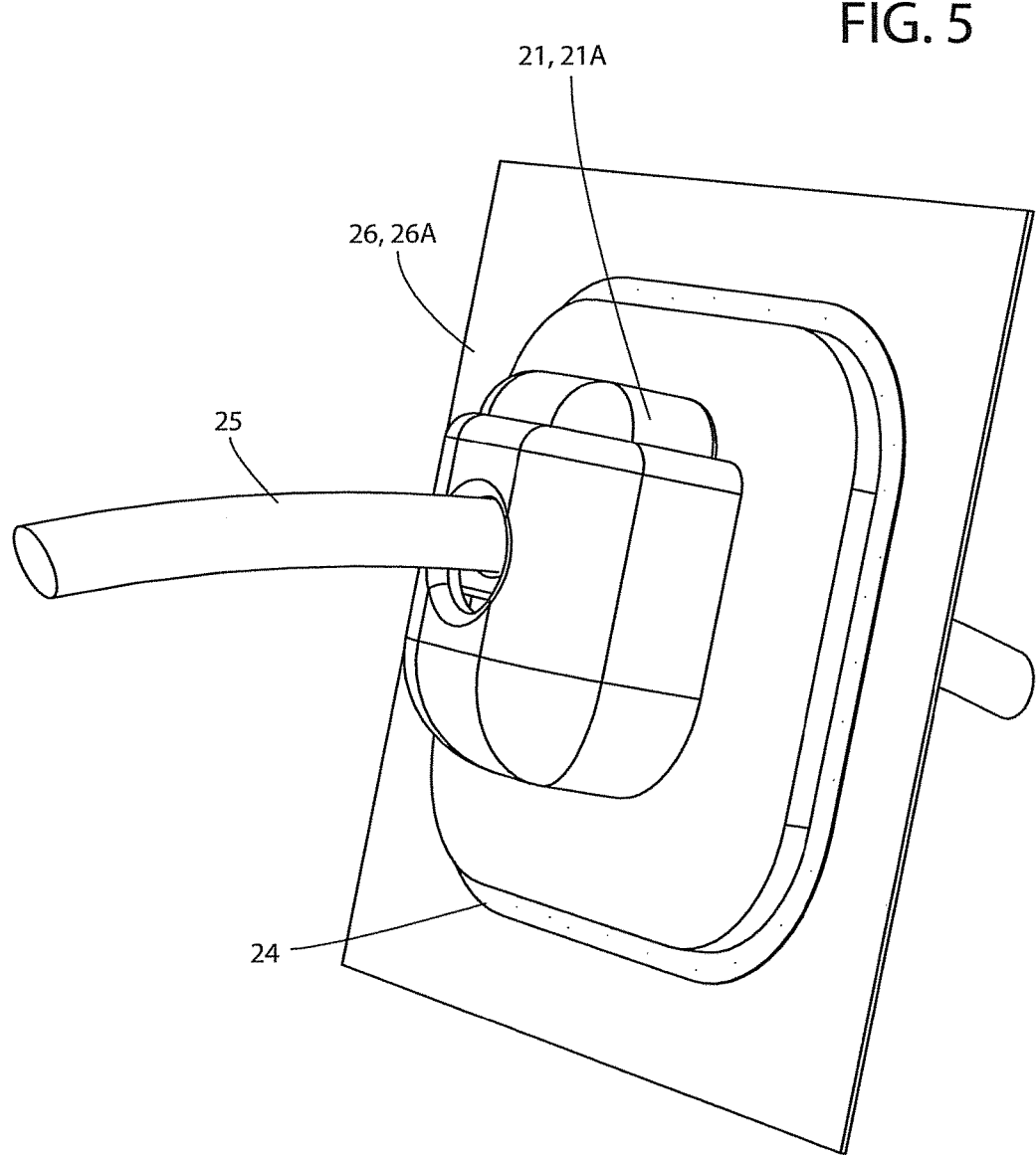
FIG. 5 is a perspective view of the FIG. 1 apparatus, affixed to the external surface of the fabric of a garment according to a particular embodiment, with a cord installed in the operative cord-lock component.
Figure 6:
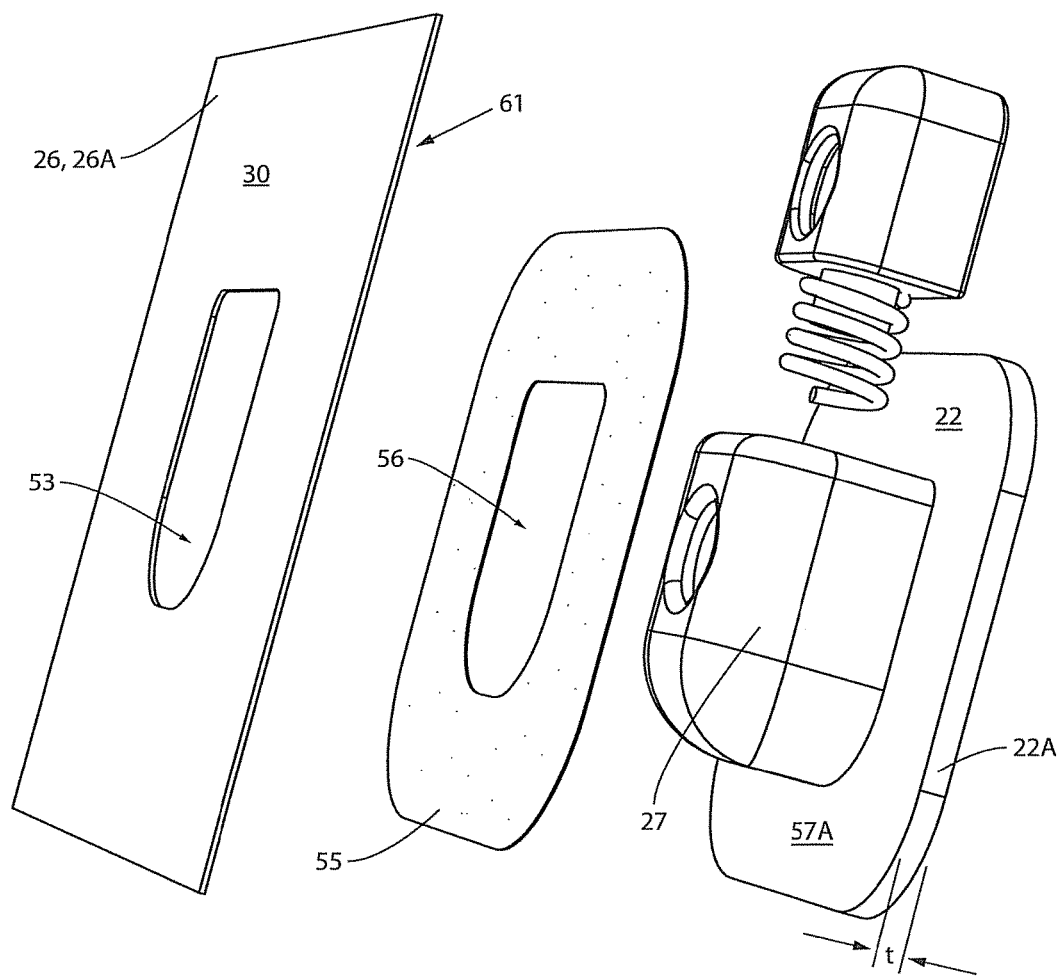
FIG. 6 is an exploded perspective view of the FIG. 1 apparatus, illustrating a method by which the apparatus may be affixed to the internal surface of the fabric of a garment according to a particular embodiment.
Figure 9A:
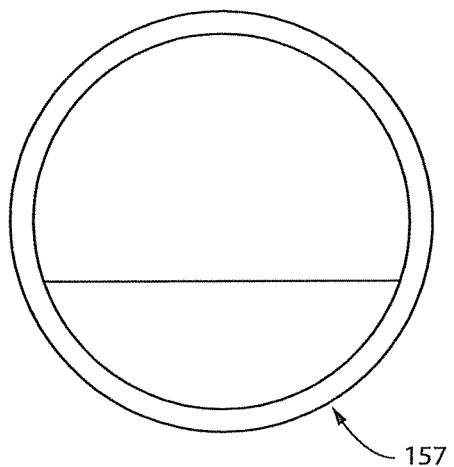
FIG. 9A, FIG. 9B, FIG. 9C and FIG. 9D (collectively FIG. 9) are respectively top, front, side and perspective views of an apparatus for mounting a hardware component to a garment according to another particular embodiment wherein the operative component is a cord lock and the apparatus is affixed to the internal surface of the fabric of a garment.
Figure 9D:
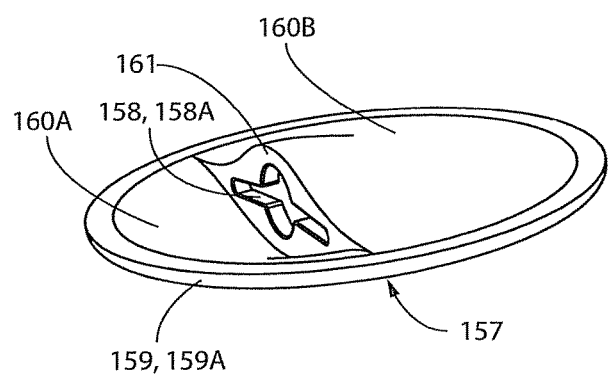
Figure 9B:
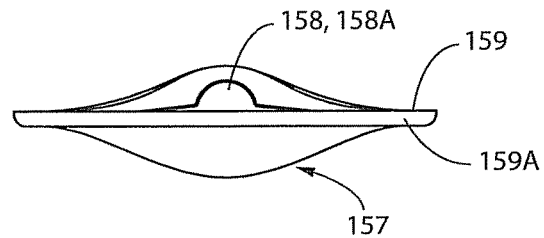
Figure 9C:
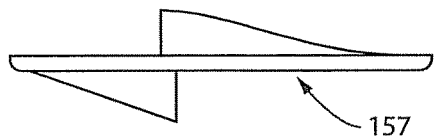

Referring now to the drawings, FIGS. 1-8 show an apparatus 20 for mounting a hardware component 21 to fabric 26 of a garment 26A according to a particular embodiment. FIGS. 4 and 5 show a method according to a particular embodiment of how apparatus 20 may be used to mount hardware component 21 to an exterior surface of fabric 26 and FIGS. 6-8 show a method according to a particular embodiment of how apparatus 20 may be used to mount hardware component 21 to an interior surface of fabric 26. Apparatus 20 comprises operative hardware component 21 and a base plate 22. Base plate 22 comprises an outwardly facing adhesive surface 57A and an inwardly facing adhesive surface 57B.

In the illustrated embodiment of FIGS. 1-8, operative hardware component 21 comprises a cord lock 21A. Cord lock 21A may be used to secure a cord 25 (FIGS. 5, 7) in a user-defined position relative to fabric 26 and/or garment 26A. For example, cord lock 21A may be adjustable between a first configuration where cord 25 is moveable to a user-defined position relative to garment 26A and a second configuration wherein cord 25 is locked or otherwise secured in a particular position relative to garment 26A. It will be appreciated that there are a number different varieties of cord lock mechanisms known in the art and that cord lock 21A represents an exemplary, non-limiting cord lock mechanism for illustrating a particular embodiment of the invention. Cord lock 21A may be manufactured to provide different sizes, different shapes and/or different locking mechanisms to work in conjunction with different types of cord, different shapes of cord (e.g. straps or the like), different sizes of cord (e.g. different diameters), multiple cords and/or the like. As discussed above, operative hardware component 21 is not limited to a single cord lock and may comprise any of a wide variety of additional or alternative operative components.

Base plate 22 of the embodiment illustrated in FIGS. 1-8 comprises a pair of adhesive surfaces including outwardly facing adhesive surface 57A and inwardly facing adhesive surface 57B. Base plate 22 may be formed from plastic or other suitable materials by molding or other suitable manufacturing process. In some embodiments, base plate 22 (or at least adhesive surfaces 57A, 57B) may be fabricated from, or coated with, a material that comprises, or is based primarily on, a polymer or group of polymers that is the same as the polymer or group of polymers that make-up, or form the basis of, adhesive 24, 55 (FIGS. 4, 6). For example, where adhesive 24, 55 is a polyurethane-based adhesive (or is based on some other suitable polymer), base plate 22 (or at least adhesive surfaces 57A, 57B) may be fabricated from, or coated with, a polyurethane-based material (or may be fabricated from a material (e.g. plastic) based on the other suitable polymer). Base plate 22 may be integrally formed with or otherwise secured to hardware component 21. In particular embodiments, base plate 22 and some or all of hardware component 21 (e.g. body 27) may be fabricated as a single plastic structure (e.g. by molding (e.g. injection molding) or some other suitable manufacturing process).

Base plate 22 may be generally planar and may extend away from hardware component 21 in transverse or radial directions (where such transverse or radial directions are directions in planes substantially parallel to the plane spanned by double-headed arrows 59, 60 (FIG. 2)). In some embodiments, the ratios of the transverse extension of base plate 22 relative to the transverse extension of body 27 of hardware component 21 in one or more particular transverse directions is greater than or equal to 1.4. In some embodiments, these ratios are greater than or equal to 1.8. In some embodiments, this ratio is greater than or equal to 2.5. As described in more detail below, base plate 22 of the illustrated embodiment includes a pair of opposing adhesive surfaces 57A, 57B which are respectively suitable for adhesive bonding to the interior surface and the exterior surface of fabric 26 of garment 26A. In some embodiments, adhesive surfaces 57A, 57B comprise surface areas greater than or equal to 150 mm$^2$. In other embodiments, such surface areas are greater than or equal to 400 mm$^2$. In some embodiments, a ratio of the surface area of adhesive surfaces 57A, 57B to the relative transverse area occupied by hardware component 21 is greater than or equal to 1.5. In some embodiments, this ratio is greater than or equal to 2.

In some embodiments, adhesive surfaces 57A, 57B may comprise particular features (other than their surface area) which may make them suitable for bonding to adhesive. By way of non-limiting example, in some embodiments, adhesive surfaces 57A, 57B may be provided with a roughened texture (e.g. having a roughness on the order of 1%-10% of the maximum thickness (t) of base plate 22) which can improve the bonding between adhesive surfaces 57A, 57B and fabric 26 of garment 26A. In some embodiments, where base plate 22 is fabricated via injection molded plastic, base plate 22 may be made with a texture in a range of SP1-C3 to MT-11070. Adhesive surfaces 57A, 57B may be generally flat. In some embodiments, adhesive surfaces 57A, 57B need not be strictly flat, but instead may comprise only relatively smooth (i.e. non-abrupt) curvature. For example, in some embodiments, adhesive surfaces 57A, 57B may comprise curvatures having radii of curvature greater than or equal to 15 mm. In some embodiments, these radii of curvature may be greater than or equal to 25 mm.

The perimeter of base plate 22 may generally be of any shape. In particular embodiments, base plate 22 is shaped to avoid sharp corners, as sharp corners may cause damage to fabric 26 (e.g. sharp corners may penetrate through or partially through fabric 26) and sharp corners provide areas of low surface area contact which may be prone to delaminate from fabric 26 over time. In particular embodiments, the radius of curvature of any corners in base plate 22 is greater than or equal to 2 mm. In some embodiments, this radius of curvature is greater than or equal to 5 mm. In the illustrated embodiment, base plate 22 is generally rectangularly shaped with corners 23 having a radius of curvature greater than greater than or equal to 2 mm.

To further minimize or otherwise reduce the possibility of delamination, edges 22A of base plate 22 may be fabricated to have a thickness (t) that is sufficiently thin and correspondingly flexible to follow easily any residual bending of fabric 26 caused, for example, by the wearer of garment 26A. For example, the thinness and/or flexibility of base plate 22 may follow residual bending of fabric 26 while exhibiting only minimal stress that would tend to cause apparatus 20 to peel away from fabric 26 when fabric 26 is bent. In particular embodiments, edges 22A of base plate 22 have thicknesses (t) that are less than or equal to 1 mm. In the illustrated embodiment, base plate 22 has a substantially uniform thickness (t) of approximately 1 mm. This uniformity of thickness (t) is not necessary. In some embodiments, the desirable ability of base plate 22 to follow the residual bending of fabric 26 may be accomplished with a base plate 22 that is relatively thick in region(s) spaced apart from its edges 22A, but which has relatively thin edges 22A. In some embodiments, a ratio of the thickness (t) of the thickest section of base plate 22 to the thinnest section (e.g. the perimeter edge) of base plate 22 is greater than or equal to 2. In some embodiments, this ratio is greater than or equal to 4. In some embodiments, the thickness (t) of base plate 22 is greater than or equal to 2 mm in a region of hardware component 21 to provide desirable rigidity and is less than or equal to 0.25 mm at its edges to provide desirable flexibility to prevent delamination. In some embodiments, the thickness (t) of base plate 22 is greater than or equal to 1 mm in a region of hardware component 21 and is less than or equal to 0.5 mm at its edges.

In the illustrated embodiment, cord lock 21A comprises: a body 27 which may be formed integrally with, or otherwise connected to, base plate 22; a plunger 28 that is partially located within a pocket 32 of body 27 and which moves relative to body 27; and a bias mechanism 29 (e.g. a spring 47 in the illustrated embodiment (FIG. 4)), which may exert bias force against one or more of the components of cord lock 21A and which may thereby exert the force desired to secure cord 25 in cord lock 21A. As explained in more detail below, adhesive 24 (FIG. 4), 55 (FIG. 6) may be applied between one or more of adhesive surfaces 57B, 57A of base plate 22 and fabric 26 to secure apparatus 20 to fabric 26.

Body 27 may be formed from plastic or other suitable materials (e.g. by molding (e.g. injection molding) or other suitable manufacturing process). Where operative component 21 is a cord lock 21A of the type shown in the illustrated embodiment of FIGS. 1-8, body 27 may have a generally hollow shape that defines a pocket 32. In defining pocket 32, body 27 comprises opposing front and back walls 33, 34 and opposing first and second side walls 35, 36 which extend between front wall 33 and back wall 34. Pocket 32 has an opening 37 on its upper edge and a lower wall 58 on the edge opposite opening 37. Front wall 33 defines a front hole 38 that extends through front wall 33 and into pocket 32. Back wall 34 in combination with base plate 22 define a rear hole 39 that extends from pocket 32 through both back wall 34 and base plate 22. Holes 38 and 39 may be substantially axially aligned.

Plunger 28 is provided in a size and shape for slidable relative movement (at least partially) within pocket 32 (i.e. between front and back walls 33, 34 and between first and second sidewalls 35, 36). Plunger 28 may be fabricated from plastic or other suitable material and may be fabricated by molding or other suitable manufacturing technique. In the illustrated embodiment, plunger 28 has a generally hollow shape that defines a concavity 44 therein. In defining concavity 44, plunger 28 comprises opposing upper and lower walls 40, 41 and opposing first and second side walls 42, 43 which extend between upper wall 40 and lower wall 41. Concavity 44 has an opening 45 on its rearward edge and a front wall 46 on an edge opposite opening 45. Front wall 46 defines a hole 31 that extends through front wall 46 and into concavity 44. In the illustrated embodiment, plunger 28 also comprises a post 48 which extends from the exterior surface of lower wall 41 in a direction away from concavity 44. Plunger 28 is slidably moveable (in directions 59) into and/or out of opening 37 of pocket 32. Plunger body 28 may be movable within pocket 32 between a first configuration in which plunger hole 31 is generally aligned with body holes 38, 39, and a second configuration in which plunger hole 31 is out of alignment with body holes 38, 39.

Bias mechanism 29 may be disposed in pocket 32 between lower wall 58 of pocket 32 and lower wall 41 plunger body 28. In the illustrated embodiment, bias mechanism 29 comprises a coil spring 47 which is fabricated as a separate (i.e. non-integrally formed) component. Coil spring 47 may be fabricated from metal, plastic or other suitable material. In other embodiments, bias mechanism 29 and plunger 28 may be integrally formed from plastic or other suitable materials using molding or another suitable manufacturing process. Coil spring 47 engages post 48 of plunger 28. When compressed, coil spring 47 provides a spring biasing effect which tends to force plunger 28 outwardly relative to pocket 32 (i.e. toward the second configuration where plunger hole 31 is out of alignment with body holes 38, 39).

FIGS. 4 and 5 depict the installation of apparatus 20 onto garment 26A in accordance with a particular embodiment wherein apparatus 20 is affixed to external surface 30 of fabric 26. In the embodiment of FIGS. 4 and 5, rearwardly facing adhesive surface 57B is bonded (by adhesive 24) to a corresponding region 30A of external surface 30 of fabric 26. A hole or opening 49 may be formed in fabric 26 by punching, cutting or the like. Hole 49 is sufficiently large to allow substantially unrestricted passage of cord 25, but it is desirable, in particular embodiments, that hole 49 not be significantly larger than necessary, to maximize the area of fabric surface 30 (e.g. region 30A) to which adhesive surface 57B is adhesively bonded. It will be appreciated that the strength of an adhesive bond between adhesive surface 57B and corresponding surface 30 of fabric 26 increases with surface area. In particular embodiments, the ratio of the surface area of adhesive surface 57B to the area of hole 49 may be greater than or equal to 2. In some embodiments, this ratio is greater than or equal to 5. In some embodiments, hole 49 is not required—e.g. where operative hardware component 21 is not a cord lock or where the cord lock functions differently.

Apparatus 20 is affixed to fabric 26 by bonding using adhesive 24 which may also be referred to as glue 24. Many types of adhesive materials can be used for adhesive 24, such as, by way of non-limiting example, polyurethane based glues. In the illustrated embodiment, adhesive 24 comprises a suitably shaped piece of sheet adhesive which may be poly-urethane based. Adhesive 24 may be provided with one or more removable backing layers on its surfaces. Such backing layers may be removed prior to bonding adhesive 24 to another surface (e.g. adhesive surfaces 57B or fabric 26). In other embodiments, adhesive 24 can comprise adhesive based on other polymers or other suitable materials. In other embodiments, adhesive 24 need not be solid, but may comprise a film, gel and/or liquid which may be sprayed, brushed or otherwise applied in desired locations (e.g. between glue surface 57B and the corresponding region 30A of surface 30 of fabric 26) using suitable application techniques (e.g. brushing, spraying or the like). Adhesive 24 may comprise thermo-activated adhesive (which may be activated by conductive heat, radiant heat, heat convection, heat generated by ultrasonic techniques, heat generated by RF radiation techniques or the like). Adhesive 24 may additionally or alternatively comprise adhesive activated by UV radiation and/or adhesive that is chemically activated (e.g. comprising one or more materials which undergo a chemical activation reaction when combined with one another or when placed in a suitable environment).

As discussed above, in some embodiments, base plate 22 (or at least adhesive surfaces 57A, 57B) may be fabricated from, or coated with, a material that comprises, or is based primarily on, a polymer or group of polymers that is the same as the polymer or group of polymers that make-up, or form the basis of, adhesive 24. For example, where adhesive 24 is a polyurethane-based adhesive (or is based on some other suitable polymer), base plate 22 (or adhesive surfaces 57A, 57B) may be fabricated from, or coated with, a polyurethane-based material (or may be fabricated from a material based on the other suitable polymer). In some embodiments, it is not necessary that adhesive 24 and adhesive surfaces 57A, 57B comprise the same polymer. In some embodiments, adhesive 24 may be selected to comprise a polymer that cross-links, covalently bonds or otherwise forms a strong bond with the polymers that form the basis of adhesive surfaces 57A, 57B. Similarly, adhesive surfaces 57A, 57B may be fabricated from (or coated with) materials that comprise a polymer that cross-links, covalently bonds or otherwise forms a strong bond with the polymers in adhesive 24. In some embodiments, the adhesive and adhesive layers may be selected to provide shear strengths greater than or equal to $2N/mm^2$ In some embodiments, such shear strengths are greater than or equal to $6N/mm^2$. In some embodiments, the adhesive and adhesive layers may be selected to provide peel strengths greater than or equal to 0.33N/mm. In some embodiments, such peel strengths are greater than or equal to 1.0N/mm.

Adhesive 24 may be provided in similar perimeter shape to adhesive surface 57B of base plate 22. Adhesive sheet 24 may have a perimeter that is the same size as, or slightly larger than, the perimeter of adhesive surface 57B to help the entirety of adhesive surface 57B (or otherwise maximize the surface area of adhesive surface 57B) to come into contact with adhesive 24. Adhesive 24 having a perimeter that is the same as, or slightly larger than, adhesive surface 57B may also help to encapsulate edges 22A of base plate 22 (at least partially (e.g. on the corner of edges 22A adjacent to fabric 26)), further reducing the risk of delamination. In some embodiments, adhesive sheet 24 extends in transverse directions 59, 60 beyond the perimeter of adhesive surface 57B by greater than or equal to 0.25 mm. In other embodiments, adhesive sheet 24 extends in transverse directions 59, 60 beyond the perimeter of adhesive surface 57B by greater than or equal to 1 mm. In still other embodiments, adhesive sheet 24 extends in transverse directions 59, 60 beyond the perimeter of adhesive surface 57B by greater than or equal to 2 mm. Adhesive sheet 24 may be provided with a hole 51. Hole 51 may be generally equal in size to (or slightly smaller than) hole 49 and may be axially aligned with hole 49 during fabrication. In some embodiments, it may be advantageous for adhesive 24 to encapsulate the edge(s) of hole 49 in fabric 26, binding the cut edges of fabric 26 to reduce fraying or tearing at the fabric edge. When secured to fabric 26 with adhesive 24, apparatus 20 may also function as a grommet, binding the cut edges around hole 49 of fabric 26, thereby reducing fraying or tearing at the edge(s) of hole 49.

Many waterproof/breathable fabrics used in garments are coated with a Durable Water Repellent (DWR) coating which helps to prevent water from saturating the external surface of the fabric. In cases where apparatus 20 is being affixed to a surface 30 coated with a DWR material, a region 30A of exterior surface 30 of fabric 26 may be prepared for adhesive bonding by means of mechanical and/or chemical etching to remove the DWR coating or to otherwise prepare area 30A of exterior surface 30 to ensure that an adequate bond is made between adhesive surface 57B and fabric 26 (e.g. to ensure that adhesive 24 penetrates the fibers of fabric 26). In other embodiments, where it is known that apparatus 20 is going to be affixed to a particular region 30A on exterior surface 30 of fabric 26, region 30A may be masked during the application of the DWR coating. For example, prior to application of the DWR coating, region 30A (i.e. the region on exterior surface 30 of fabric 26 where it is desired to apply adhesive) is covered with a suitably shaped mask (not shown) of some suitable material (e.g. plastic or textile). The mask may be temporarily bonded, mechanically clamped, pinned or otherwise fastened in location to the bare fabric. A DWR coating may then applied to the exterior surface 30 of fabric 26, but the DWR material does not penetrate the mask; consequently, region 30A beneath the mask is DWR free. The temporary mask is then removed, exposing a fabric region 30A suitable for accepting adhesive.

Further details of methods for affixing the adhesive surfaces of hardware components to the fabric of garments are described below.

After affixing adhesive surface 57B to exterior surface 30 of fabric 26, plunger 28 may be inserted in pocket 32 and depressed to compress bias mechanism 29 such that plunger hole 31 is aligned with body holes 38, 39. With holes 31, 38, 39 in substantial alignment, cord 25 may be inserted from one direction such that it extends through body 27, plunger 28, back wall 34, base plate 22 and fabric hole 49. With plunger 28 depressed such that holes 31, 38, 39 are aligned, cord 25 can be pulled through holes 31, 38, 39 and through fabric hole 49 in either direction, to selectively position cord 25 where desired along its length relative to cord lock 21 and fabric 26.

When inward pressure on plunger 28 is released, bias mechanism 29 urges plunger 28 outwardly relative to pocket 32, such that plunger hole 31 becomes misaligned with body holes 38, 39. The misalignment of holes 31 and 38, 39 creates a binding effect on cord 25 within body 27. Secured in this manner, cord 25 is locked (i.e. not pulled easily in either direction) relative to cord lock 21 and fabric 26. When it becomes necessary or desirable to reposition cord 25 relative to cord lock 21, plunger 28 is depressed, compressing bias mechanism 29 and realigning plunger hole 31 with body holes 38, 39. Cord 25 can then be slid through cord lock 21 until the desired position of cord 25 relative to cord lock 21 and fabric 26 is achieved. By again releasing plunger 28, cord 25 becomes locked within cord lock 21.

In addition to changes in general size and shape of cord lock 21 to accommodate different size cords 25, multiple cords, straps, strings or the like, further modifications thereof are possible to achieve other advantages and functions. By way of non-limiting example, the direction in which the cord protrudes from the cord lock 21 can be adjusted if holes 38, 39 and 31 are moved accordingly. In some embodiments, for example, the cord lock may be configured such that the movement of plunger 28 is generally perpendicular (or oriented at some other non-parallel angle) relative to the plane of base plate 22 (i.e. the plane defined by directions 59, 60).

FIGS. 6-8 illustrate apparatus 20 in a different installation configuration and a corresponding different installation method according to a particular embodiment wherein apparatus 20 is affixed to internal surface 61 of fabric 26. In the embodiment of FIGS. 6-8, forwardly facing adhesive surface 57A (see FIGS. 1 and 2) is adhesively bonded (by adhesive 55) to a corresponding region of internal surface 61 of fabric 26. Forwardly facing adhesive surface 57A may be similar in many respects to rearwardly facing adhesive surface 57B and may comprise features similar to those of rearwardly facing adhesive surface 57B. Installation according to the embodiment of FIGS. 6-8 can be particularly advantageous if fabric 26 has an external DWR coating and removal of this coating is not desired or possible or it is otherwise undesirable or difficult to treat or mask the DWR coating in a manner which permits adhesive 55 to bond to external surface 30 of fabric 26. However, installation according to the embodiment of FIGS. 6-8 is not limited to any such circumstance.

In accordance with the illustrated embodiment of FIGS. 6-8, a suitably shaped hole or opening 53 is formed in fabric 54 by punching, cutting or the like. The size and shape of hole 53 is configured to permit at least a portion of operative component 21 to be inserted therethrough. In the illustrated embodiment, hole 53 is sized and shaped to permit a portion of body 27 to extend therethrough. It is desirable, in particular embodiments, that hole 53 not be significantly larger than necessary, to maximize the surface area of interior fabric surface 61 to which adhesive surface 57A is adhesively bonded. It will be appreciated that the strength of an adhesive bond between adhesive surface 57A and corresponding surface 61 of fabric 26 increases with surface area. In particular embodiments, the ratio of the surface area of adhesive surface 57A to the area of hole 53 may be greater than or equal to 1.5. In some embodiments, this ratio is greater than or equal to 2. In some embodiments, this ratio is greater than 3.

Adhesive 55 may be substantially similar to adhesive 24 described above and may comprise similar features and/or characteristics. In the illustrated embodiment, adhesive 55 comprises a sheet adhesive which may have a base of polyurethane or the like. In a manner similar to that of adhesive 24 and adhesive surface 57B, adhesive 55 may be provided with a similar perimeter shape to adhesive surface 57A of base plate 22. Adhesive sheet 55 may be slightly larger than the perimeter of adhesive surface 57A to help maximize the surface area contact between adhesive surface 57A and adhesive 55 and/or to encapsulate edges 22A of base plate 22 (at least partially (e.g. on the corners of edges 22A adjacent to fabric 26)), further reducing the risk of delamination. Adhesive sheet 55 may be provided with a hole 56. Hole 56 may be substantially equal in size to (or slightly smaller than) hole 53 and may be axially aligned with hole 53 during fabrication. In some embodiments, it may be advantageous for adhesive 55 to encapsulate the edge(s) of hole 53 in fabric 26, binding the cut edges of fabric 26 to reduce fraying or tearing at the fabric edge. In some embodiments, bonding apparatus 20 to interior surface 61 of fabric 26 has the additional advantages that: base plate 22 is substantially larger than hole 53, so that base plate 22 mechanically inhibits apparatus 20 from being removed from garment 26A; and interior surface 61 of fabric may accept adhesive 55, even when exterior surface 30 is coated with a DWR material.

In other respects, the installation and use of the embodiment depicted in FIGS. 6-8 is similar to that described herein in relation to the embodiment depicted in FIGS. 4 and 5.

The adhesive bonding of apparatus 20 to fabric 26 of garment 26A permits operative component 21 to be integrated into garment 26A, reducing the possibility of snags and increasing the overall aesthetic appeal of garment 26A. For example, operative components that are stitched to the fabric of a garment are typically stitched at a location that is spaced apart from the edges and/or corners of the components. According, the edges and/or corners of such operative components can be snagged and can cause tearing of the garment and/or the tearing of the component from the garment. The adhesive bonding of apparatus 20 to fabric 26 of garment 26A also limits or inhibits water ingression into garment 26A. More particularly, adhesive bonding significantly reduces the number and length of assembling stitches (which are significant water ingress points) in relation to prior art hardware affixation techniques. Reducing the number and length of stitches also eliminates the need to cover the corresponding stitches with a seam tape or the like in the case of manufacturing waterproof garments, saving both the additional weight of the tape and the extra manufacturing time and cost. Reducing the number and length of stitches is also desirable in conventional, water-resistant or even non-waterproof garments because reducing the number and length of stitches can minimize or reduce the number of water ingress locations.

FIGS. 9-12 depict an apparatus 157 and corresponding method for mounting an operative hardware component 158 to the fabric 162 of a garment 162A according to another particular embodiment. In the illustrated embodiment of FIGS. 9-12, operative component 158 comprises a cord lock 158A. Apparatus 157 also comprises a base 159 having a pair of adhesive surfaces 160A, 160B suitable for adhesive bonding to interior surfaces of fabric 162 of garment 162A as described in more detail below.

Figure 10:
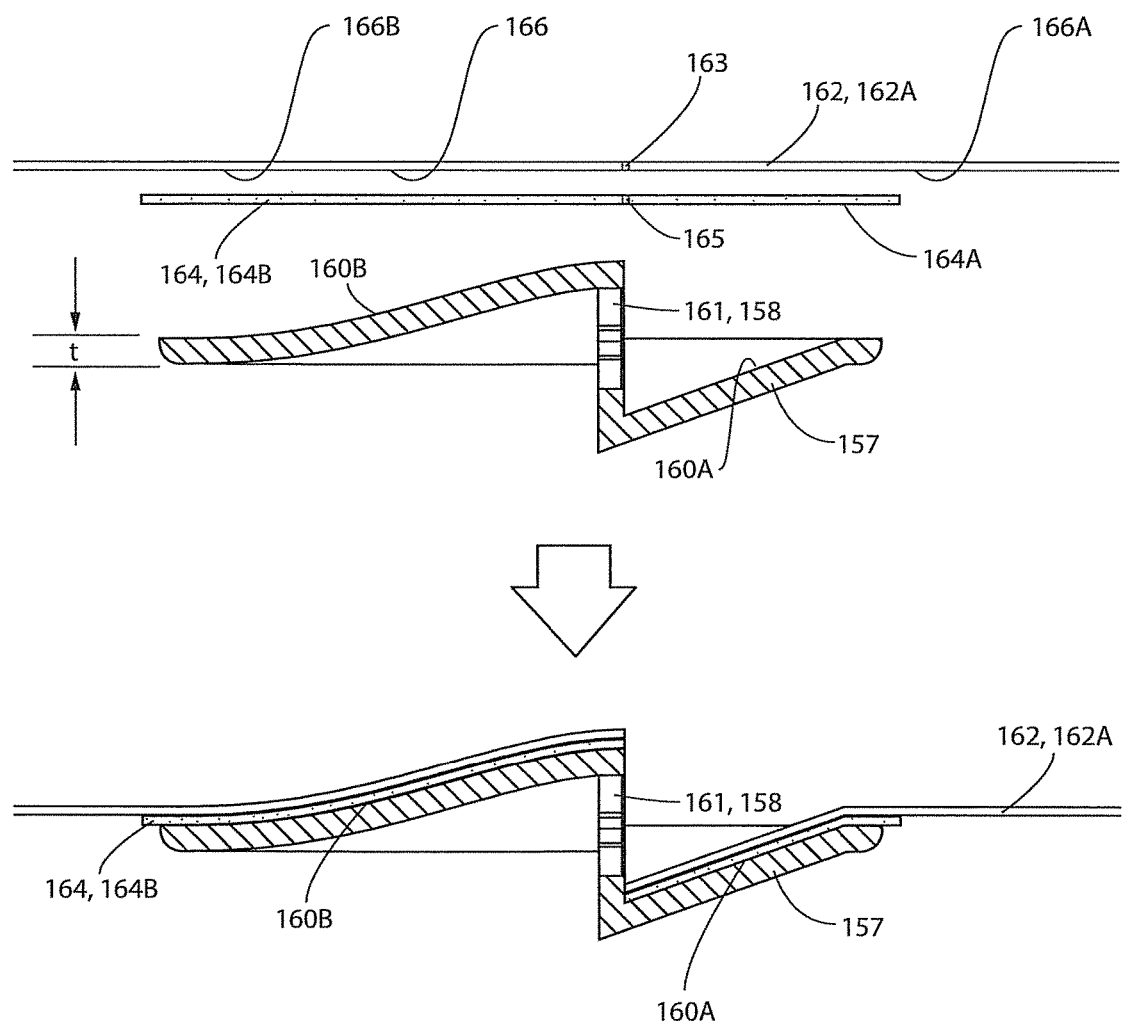
FIG. 10 is a cross section side view of the FIG. 9 apparatus, illustrating a method by which the hardware may be attached to the internal surface of the fabric of a garment according to a particular embodiment.
Figure 13A:
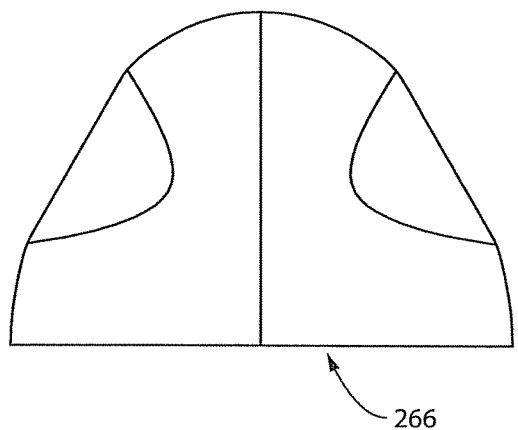
FIG. 13A, FIG. 13B, FIG. 13C and FIG. 13D (collectively FIG. 13) are respectively top, front, side and perspective views of an apparatus for mounting a hardware component to a garment according to another particular embodiment wherein the operative component is a cord lock and the apparatus may be installed between a pair of internal fabric surfaces of a garment.
Figure 13D:
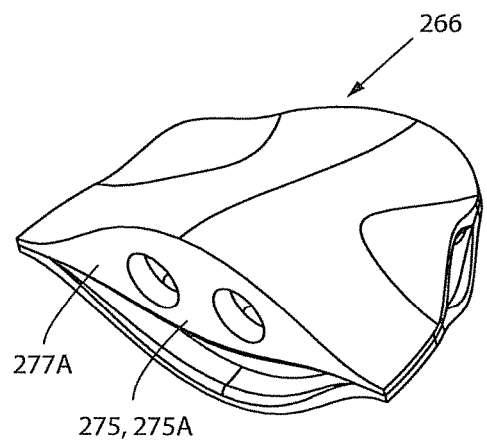
Figure 13B:
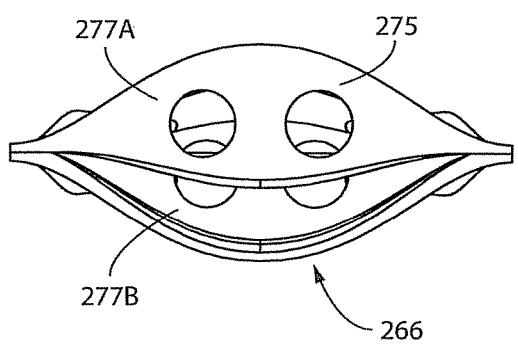
Figure 13C:
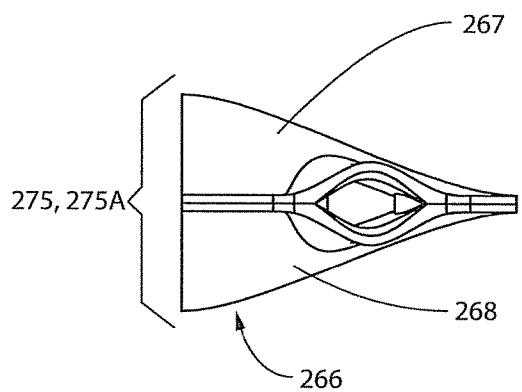

Base 159 may be similar in many respects to base 22 of apparatus 20 described above and may comprise similar features to base 22 of apparatus 20. Base 159 may be fabricated from plastic or other suitable material (e.g. by molding (e.g. injection molding) or other suitable manufacturing process). In some embodiments, base 159 may be fabricated from a material that comprises, or is based primarily on, a polymer or group of polymers that is the same as the polymer or group of polymers that make-up, or form the basis of, adhesive 164 (FIG. 10). For example, where adhesive 164 is a polyurethane-based adhesive (or is based on some other suitable polymer), base 159 may be fabricated from a polyurethane-based material (or may be fabricated from a material based on the other suitable polymer). The perimeter of base 159 may generally be of any shape. In particular embodiments, base 159 is shaped to avoid sharp corners, as sharp corners may cause damage to fabric 162 (e.g. sharp corners may penetrate through fabric 162) and sharp corners provide areas of low surface area contact which may be prone to delaminate from fabric 162 over time. In particular embodiments, the radius of curvature of any corners in base 159 is greater than 2 mm. In the illustrated embodiment, base 159 is generally circularly shaped with a radius of curvature greater than 5 mm.

Base 159 may have a thickness (t) which is shown best in FIG. 10 and may be shaped to provide adhesive surface 160A with a generally concave shape and adhesive surface 160B with a generally convex shape. To further minimize or otherwise reduce the possibility of delamination, edges 159A of base 159 may be fabricated such that thickness (t) is sufficiently thin and correspondingly flexible to follow easily any residual bending of fabric 162 caused, for example, by the wearer of the corresponding garment. For example, the thinness and/or flexibility of base 159 may follow residual bending of fabric 162 while exhibiting only minimal stress that would tend to cause apparatus 157 to peel away from fabric 162 when fabric 162 is bent. In particular embodiments, edge 159A of base 159 has a thickness (t) less than or equal to 1 mm. In the illustrated embodiment, base 159 has a substantially uniform thickness (t) of approximately 1 mm. This uniformity of thickness (t) is not necessary. In some embodiments, the desirable ability of base 159 to follow the residual bending of fabric 162 may be accomplished with a base 159 that is relatively thick in region(s) spaced apart from its edge 159A, but which has a relatively thin edge 159A. In some embodiments, a ratio of the thickness (t) of the thickest section of base plate 159 to the thinnest section of base plate 159 is greater than or equal to 2. In some embodiments, this ratio is greater than or equal to 4. In some embodiments, the thickness (t) of base plate 159 is greater than or equal to 2 mm in its thickest region to provide desirable rigidity and is less than or equal to 0.25 mm at its edges 159A to provide desirable flexibility to prevent delamination. In some embodiments, the thickness (t) of base plate 159 is greater than or equal to 1 mm in its thickest region and is less than or equal to 0.5 mm at its edges 159A.

In some embodiments, adhesive surfaces 160A, 160B each have surface areas on which are greater than or equal to 150 mm$^2$. In other embodiments, such surface areas are greater than or equal to 400 mm$^2$. Other than for being concave and convex, adhesive surfaces 160A, 160B may otherwise be similar to adhesive surface 57B described above and may comprise features similar to those of adhesive surface 57B described above. In the illustrated embodiment, operative hardware component 158 of apparatus 157 comprises a plate (or the like) 161 which may be integrally formed with or otherwise connected to base 159 and which extends between adhesive surfaces 160A, 160B. By modifying the shape(s) of adhesive surfaces 160A, 160B (in comparison to the adhesive surfaces 57A, 57B of the embodiments of FIGS. 1-8), operative component 158 can incorporate plate 161 between adhesive surfaces 160A, 160B of base 159. When adhesive surfaces 160A, 160B are bonded with adhesive 164 to fabric 162, they act to secure apparatus 157 relative to fabric 162 as described in more detail below.

FIG. 10 illustrates a method for installing apparatus 157 on a garment 162A according to a particular embodiment. A hole or opening 163 is formed in fabric 162 by punching, cutting or the like. Since plate 161 of active component 158 is generally perpendicular to the edges of adhesive surfaces 160A, 160B between which plate 161 extends (i.e. plate 161 extends in a direction that is generally normal to the planes tangent to adhesive surfaces 160A, 160B at the inner edges thereof), opening 163 may be provided in the form of a slit 163 cut into fabric 162. Slit 163 may extend into and out of the page in the illustrated view of FIG. 10. The dimension of slit 163 in the direction into and out of the page in FIG. 10 may be greater than the corresponding dimension of plate 161. Slit 163 enables plate 161 of operative component 158 to be visible and accessible from the outside of garment 162A while still maximizing the amount of surface area between adhesive surfaces 160A, 160B and corresponding surfaces 166A, 166B on interior surface 166 of fabric 162.

Adhesive 164 may be substantially similar to adhesive 24 described above and may comprise features similar to those of adhesive 24 described above. In the illustrated embodiment, adhesive 164 comprises a polyurethane sheet adhesive or the like and may be provided in similar perimeter shape to adhesive surfaces 160A, 160B of base 159. Adhesive sheet 164 may be slightly larger than the perimeter of adhesive surfaces 160A, 160B to help maximize the surface area contact between adhesive surfaces 160A, 160B and adhesive 164 and/or to encapsulate edges 159A of base 159 (at least partially (e.g. on the corners of edges 159A adjacent to fabric 162)), further reducing the risk of delamination. Adhesive sheet 164 may be provided with a hole 165. Hole 165 may be substantially similar (or slightly smaller) in size and shape to hole 163 and may be aligned with hole 163. In some embodiments, it may be advantageous for adhesive 164 to encapsulate the edge(s) of hole 163 in fabric 162, binding the cut edges of fabric 162 to reduce fraying or tearing at the fabric edge.

As shown in FIG. 10, apparatus 157 is bonded to interior surface 166 of fabric 162 such that adhesive surface 160A is bonded to corresponding region 166A on interior surface of fabric 162 by adhesive 164 in corresponding region 164A and adhesive surface 160B is bonded to corresponding region 166B on interior surface 166 of fabric 162 by adhesive 164 in corresponding region 164B. Further details of methods for affixing the adhesive surfaces of hardware components to the fabric of garments are described below.

It will be understood by those skilled in the art that with suitable modification to the above-described processes, apparatus 157 could be bonded to the external surface of fabric 162.

FIGS. 13-15 illustrate an apparatus 266 and corresponding method for mounting an operative hardware component 275 between fabric layers 269, 270 of a garment 280 according to another particular embodiment. Fabric layers 269, 270 may be provided on the same piece of fabric (e.g. folded over to provide layers 269, 270) or may be provided on separate pieces of fabric. In the illustrated embodiment of FIGS. 13-15, operative component 275 comprises a cord lock 275A, which itself comprises a pair of plates 277A, 277B which may be generally parallel and transversely spaced apart from one another. Apparatus 266 also comprises a pair of generally opposing adhesive surfaces 267, 268 which extend transversely away from plates 277A, 277B respectively and which are suitable for adhesive bonding as described in more detail below. Apparatus 266 is well suited for, but not limited to, application at an edge of garment 280.

In some embodiments, adhesive surfaces 267, 268 each have cross-sectional areas that are greater than or equal to 150 mm$^2$. In other embodiments, such surface areas are greater than or equal to 400 mm$^2$. Adhesive surfaces 267, 268 are curved for fitting between fabric layers. Other than for being curved, adhesive surfaces 267, 268 may be similar to adhesive surface 57B described above and may comprise features similar to those of adhesive surface 57B.

The installation of apparatus 266 is shown best in FIGS. 14 and 15. To the extent that there is no opening between fabric layers 269, 270, a hole or opening 276 may be formed between fabric layers 269, 270, such that operative component 275 can be seen and accessed from the outside of garment 280. In some embodiments, where edges 273, 274 of fabric layers 269, 270 are separate from one another, edges 273, 274 may be joined together (e.g. by sewing or gluing edges 273, 274 together). It will be appreciated by those skilled in the art, that edges 273, 274 may be joined to one another using other suitable techniques known in the garment industry. In some embodiments, fabric layers 269, 270 may be provided by the same piece of fabric in which case fabric may be folded at edges 273, 274. In such embodiments, there is no need to separately join edges 273, 274 to one another.

Adhesive 271, 272 may be substantially similar to adhesive 24 described above and may comprise features similar to those of adhesive 24. In the illustrated embodiment, adhesive 271, 272 comprises polyurethane sheet adhesive or the like and may be provided in similar perimeter shape to adhesive surfaces 267, 268. Adhesive sheets 271, 272 may be slightly larger than the perimeter of adhesive surfaces 267, 268 to help maximize the surface area contact between adhesive surfaces 267, 268 and adhesive 271, 272 and/or to encapsulate edges of apparatus 266 (at least partially (e.g. on the corners of the edges that adjacent to fabric layers 269, 270)), further reducing the risk of delamination.

As shown in FIGS. 14 and 15, adhesive surface 267 of apparatus 266 is bonded to the interior surface of fabric layer 269 by adhesive sheet 271 and adhesive surface 268 of apparatus 266 is bonded to the exterior surface of fabric layer 270 by adhesive sheet 272. Further details of methods for affixing the adhesive surfaces of hardware components to the fabric of garments are described below.

FIG. 15 illustrates the completed installation of apparatus 266 showing how cord 276 is used in conjunction of operative component 275. In the ambient configuration of apparatus 266, plates 277A, 277B are oriented (with respect to one another) such that their holes (not explicitly numerated) are misaligned. In this configuration, cord 276 is locked relative to cord lock 275A. However, a user may squeeze apparatus 266, such that the alignment between plates 277A, 277B changes and the holes of surfaces 277A, 277B are aligned. This configuration of apparatus 266 permits cord 276 to be adjusted relative to cord lock 275A.

Figure 20A:
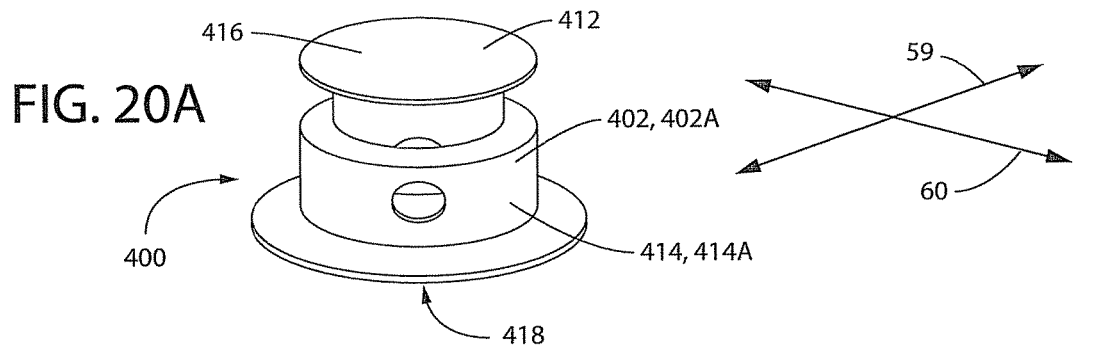
FIG. 20A, FIG. 20B and FIG. 20C (collectively, FIG. 20) are respectively, perspective, side elevation and in-situ views of an apparatus for mounting a hardware component to a garment according to another particular embodiment wherein the operative component is a cord lock and the apparatus may be installed between a pair of internal fabric surfaces of a garment.
Figure 20B:
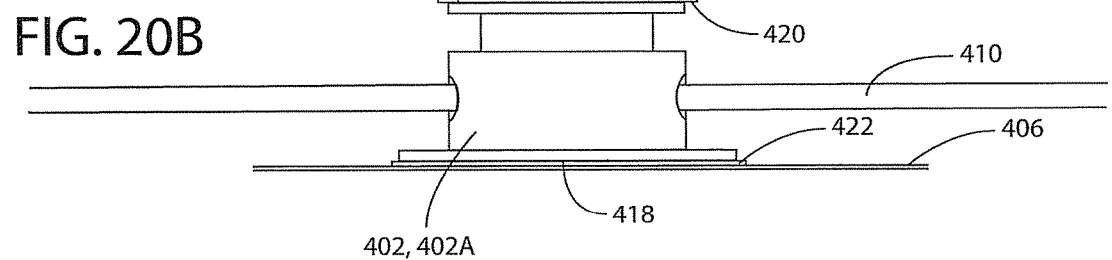
Figure 20C:
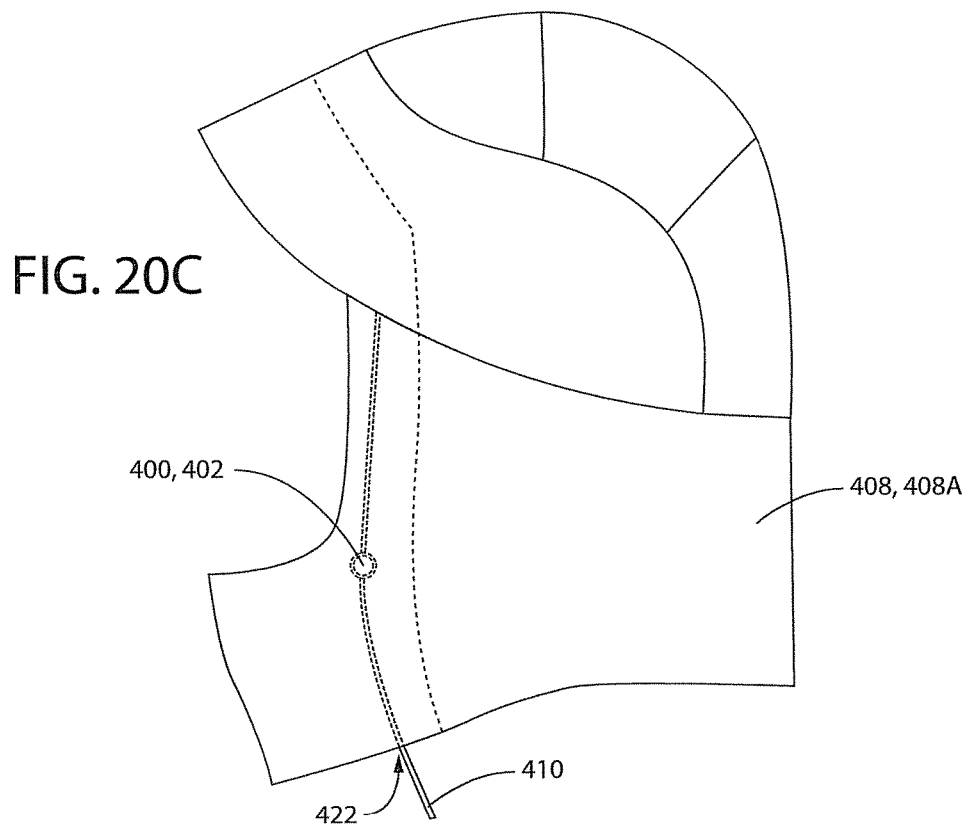

FIGS. 20A, 20B and 20C illustrate an apparatus 400 and corresponding method for mounting an operative hardware component 402 between fabric layers 404, 406 of a garment 408 according to another embodiment. Fabric layers 404, 406 may be provided on the same piece of fabric (e.g. folded over to provide layers 404, 406) or may be provided on separate pieces of fabric. In the illustrated embodiment of FIGS. 20A, 20B and 20C, hardware component 402 comprises a cord lock 402A for cord 410 which is used in a hood 408A of garment 408. Cord lock 402A is similar in some respects to cord lock 21A of FIGS. 1-8 in that cord lock 402A comprises a spring biased plunger 412 which extends partially into a pocket (not specifically enumerated) defined by wall(s) 414 of base 414A. Cord lock 402A differs from cord lock 21A of FIGS. 1-8 in that cord 410 extends through cord lock 402A in a generally transverse direction which allows apparatus 400 to be located between fabric layers 404, 406 at a location away from an aperture where 422 where cord 410 exits from between fabric layers 404, 406—i.e. away from an edge of fabric layers 404, 406.

Apparatus 400 comprises a pair of transversely extending adhesive surfaces 416, 418 which are suitable for adhesive bonding to fabric layers 404, 406. In some embodiments, adhesive surfaces 416, 418 each have cross-sectional areas that are greater than or equal to 150 mm$^2$. In other embodiments, such surface areas are greater than or equal to 400 mm$^2$. Adhesive surfaces 416, 418 of the illustrated embodiment are generally flat. Adhesive surfaces 416, 418 may be similar to adhesive surface 57B described above and may comprise features similar to those of adhesive surface 57B.

In the illustrated embodiment, apparatus 400 is installed between fabric surfaces 404, 406 using adhesive 420 between adhesive surface 416 and fabric layer 404 and using adhesive 422 between adhesive surface 428 and fabric layer 406. In some embodiments, plunger 412 can be mounted on fabric layer 404 (using adhesive 420 applied between adhesive surface 416 and fabric layer 404) and base 414A can be separately mounted on fabric layer 406 (using adhesive 422 applied between adhesive surface 418 and fabric layer 406). Once these two components (plunger 412 and base 414A) have been separately mounted on their respective fabric layers 404, 406, then the fabric layers can be joined to one another (e.g. by folding a single piece of fabric and optionally stitching layers 404, 406 to one another or by stitching two separate pieces of fabric together. Plunger 412 and base 414A may be coupled to one another at the same time as fabric layers 404, 406 are joined. In other embodiments, adhesive 420, 422 may be first applied to adhesive surfaces 416, 418 and then fabric layers 404, 406 can be joined to one another first (provided that there is some opening in which to insert apparatus 400 therebetween). Apparatus can then subsequently be inserted through the opening and between fabric layers 404, 406 where adhesive layers 420, 422 can be bonded to fabric layers 404, 406. In some embodiments, it is not necessary to bond both adhesive surface 416 to fabric layer 404 and adhesive surface 418 to fabric layer 406. In such embodiments, one of adhesive surfaces 416, 418 may be bonded to its corresponding fabric layer 404, 406 and the other one of adhesive surfaces 416, 418 may be floating.

Adhesive 420, 422 may be substantially similar to adhesive 24 described above and may comprise features similar to those of adhesive 24. In the illustrated embodiment, adhesive 420, 422 comprises polyurethane sheet adhesive or the like and may be provided in similar perimeter shape to adhesive surfaces 416, 418. Adhesive sheets 420, 422 may be slightly larger than the perimeter of adhesive surfaces 416, 418 to help maximize the surface area contact between adhesive surfaces 416, 418 and adhesive 420, 422 and/or to encapsulate edges of apparatus 400 (at least partially (e.g. on the corners of the edges that adjacent to fabric layers 404, 406)), further reducing the risk of delamination. Further details of methods for affixing the adhesive surfaces of hardware components to the fabric of garments are described below.

Figure 16:
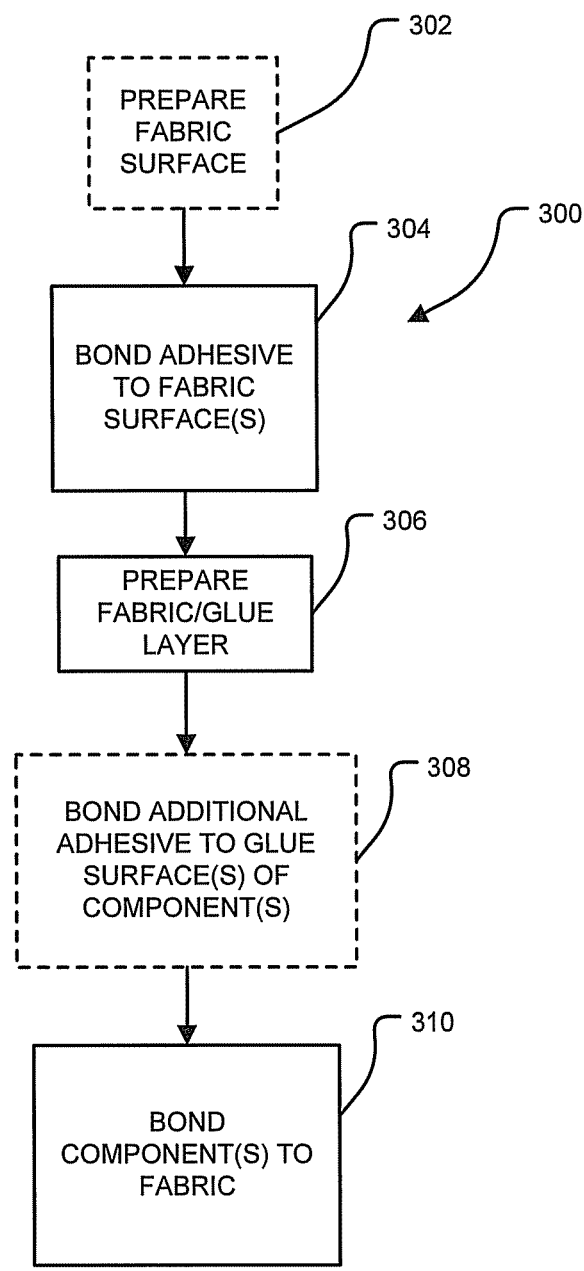
FIG. 16 is a schematic block diagram of a method for affixing adhesive surface(s) of the various apparatus described herein to the corresponding fabric surface(s) of garments according to a particular embodiment of the invention.

FIG. 16 is a schematic block diagram of a method 300 for affixing adhesive surface(s) of the various apparatus described herein to the corresponding fabric surface(s) of garments according to a particular embodiment of the invention. Method 300 commences in optional block 302 which involves preparing the fabric surface (or at least the region of the fabric surface to which the adhesive surface of the component may be bonded) to accept adhesive. For example, where the adhesive surface of the component is being bonded to an exterior surface of fabric having a DWR coating, then block 302 may involve mechanical and/or chemical etching to remove the DWR coating or to otherwise prepare the fabric region to ensure that adhesive will penetrate the fibers of the fabric in this region. In some embodiments, block 302 may comprise masking a region of the fabric while a DWR coating is being applied thereto. In some embodiments, block 302 may comprise providing a thin initial layer (or small initial amount) of adhesive (and/or a constituent of the adhesive and/or an adhesive primer) to a region of the fabric where it is desired to mount hardware. In some embodiments, block 302 may comprise providing multiple fabric layers (e.g. by folding over a piece of fabric or stitching together multiple pieces of fabric). In some embodiments, block 302 may comprise punching or otherwise forming holes in the fabric.

Method 300 then proceeds to block 304 which, in the illustrated embodiment, involves bonding adhesive to the corresponding fabric region. In particular embodiments, where the adhesive is provided in the form of a sheet adhesive, block 304 may comprise aligning the sheet adhesive to the corresponding fabric region and bonding sheet adhesive to the corresponding fabric region. For example, in the embodiment of FIGS. 4 and 5, adhesive sheet 24 may be bonded to region 30A of fabric 26; in the embodiment of FIGS. 6-8, adhesive sheet 55 may be bonded to a corresponding region of fabric 26; in the embodiment of FIG. 10, adhesive sheet 164 may be bonded to corresponding region (s) of fabric 162; in the embodiment of FIG. 14, adhesive sheets 271, 272 may be bonded to corresponding regions of fabric layers 269, 270; and in the embodiment of FIG. 20, one or both of adhesive sheets 420, 422 may be bonded to corresponding regions of fabric layers 404, 406.

Where the adhesive being used is heat activated, block 304 may involve the use of a heat press. A heat press typically comprises a heated piston or the like which may be configured to apply force or pressure against an optionally heated backing surface. Material(s), such as aligned fabric and adhesive layers, may be located between the piston and the backing surface such that a combination of heat and pressure is applied to the material(s) by the cooperating action of the piston and backing surface. In block 304, the combination of heat and pressure is preferably sufficient to cause the adhesive to penetrate the fibers of the fabric. In some embodiments, the heat associated with the application of the heat press melts the adhesive (i.e. changes it from solid to liquid). In some embodiments, the heat associated with the application of the heat press reduces the viscosity of the adhesive. In some embodiments, the pressure associated with the application of the heat press squeezes liquid (or liquefied) adhesive into spaces in the fibers of the fabric. In block 304 of the illustrated embodiment, adhesive sheets are bonded directly to fabric before the application of components. Consequently, the active surfaces of the heat press piston and the heat press backing surface may be generally flat.

Block 304 may optionally also involve the use of a cold press. A cold press may be similar to a hot press, except that one or both of the active surfaces of the piston and backing surface may be at relatively low temperature. In some embodiments, one or both of the active surface of the piston and the backing surface of the cold press may be actively cooled (e.g. by running cooling fluid (e.g. water) through the piston and/or the backing element near their respective surfaces). In some embodiments, the heat press and the cold press may be integrated. For example, a press may comprise multiple arms or the like which may be selectively activated by a user or by a suitable control system. Each such arm may comprise a particular element—e.g. one arm may comprise the heat press piston, one arm may comprise the cold press piston, one arm may comprise the heat press backing surface and one arm may comprise the cold press backing surface. In some embodiments, the same backing surface may be used by both the heat press and the cold press. In embodiments where the adhesive being used is heat activated, the combination of heat and pressure applied by a heat press may cause the adhesive to penetrate the fibers of the fabric and the subsequent application of a cold press may cause the adhesive to cross-link, covalently bond, solidify or otherwise form a strong bond when the adhesive is located at least partially within the fibers of the fabric. In some embodiments, the cold press is applied within 1 minute of application of the heat press in block 304 to bond the adhesive to the fabric. In other embodiments, the cold press is applied within 10 seconds of application of the heat press in block 304 to bond the adhesive to the fabric. In some embodiments, the cold press is applied within 5 seconds of application of the heat press in block 304 to bond the adhesive to the fabric.

As discussed in other portions of this description, in other embodiments, there are other techniques for activating the adhesive to bond the adhesive to the fabric. Such techniques are described herein and block 304 may additionally or alternatively comprise any such techniques. In addition to any such adhesive activation techniques, block 304 may also involve application of pressure to assist the adhesive to penetrate the fibers of the fabric. As discussed herein, adhesive may be provided in a variety of formats and may be applied to a surface of the fabric using a variety of techniques and block 304 may comprise any such adhesive application techniques.

Method 300 then proceeds to block 306 which involves preparing the adhesive/fabric layer created in block 304. Block 306 may involve cutting and/or punching holes or slits in the block 304 adhesive/fabric layers. For example, in the embodiment of FIGS. 4 and 5, block 306 may involve the simultaneous creation of holes 49, 51 described above; in the embodiment of FIGS. 6-8, block 306 may involve the simultaneous creation of holes 53, 56; in the embodiment of FIG. 10, block 306 may involve the creation of slits 163, 165; and in the embodiment of FIG. 14, block 306 may involve the creation of hole 276. In the embodiment of FIG. 20, a hole is not required in the block 304 adhesive/fabric layers. In some embodiments, holes or slits may be prepared in the adhesive and in the fabric prior to laminating the adhesive to the fabric in block 304, in which case block 306 may not be necessary. In other embodiments, holes or slits are not required in which case block 306 may not be necessary.

Method 300 may involve optional block 308 which is explained in more detail below. Assuming for the moment, that optional block 308 is not used, method 300 proceeds to block 310. Block 310 involves aligning the adhesive surface (s) of the component(s) to be affixed with the adhesive/fabric region prepared in block 304 and bonding the component(s) to the block 304 fabric/adhesive layers. In particular embodiments, where the adhesive is activated by heat, block 310 may involve the application of heat and/or pressure to the block 304 adhesive/fabric layers and/or the glue surface of the component to bond the component to the fabric. For example, in some embodiments, block 310 may involve re-melting the adhesive in the block 304 adhesive/fabric layers such that it bonds to the corresponding adhesive surface of the component.

In some embodiments, block 310 may involve the application of heat and/or pressure using a heat press, which may be the same or similar to heat press used in block 304. However, the presence of the component means that it may be difficult to apply sufficient heat and/or pressure with a flat heat press (i.e. with a flat piston surface and a flat backing surface). In particular embodiments, therefore, one or both of the active piston surface or the backing surface may be provided with a component retainer. A component retainer may have a shape that is complementary to the shape of certain portions of the component being bonded in block 310. Such portions may include the operative component or portions thereof. Where it is desired to locate an operative component on the same side of a fabric surface that is being bonded to (e.g. where it is desired to locate an operative component on an exterior of a garment and to bond the component to the exterior of the garment—as is the case, for example, in the embodiment of FIGS. 4 and 5), then the portions of the component being retained in the component retainer may include portions of the component opposing the adhesive surface(s). Where it is desired to have an operative component project through the fabric (e.g. where it is desired to have an operative component project from the interior of a fabric layer to the exterior of the fabric layer while bonding the adhesive surface(s) of the component to the interior surface of the fabric layer—as is the case, for example, in the embodiment of FIGS. 6-8), then the portions of the component being retained in the component retainer may include portions of the component which are surrounded by adhesive surface(s).

Figure 21:
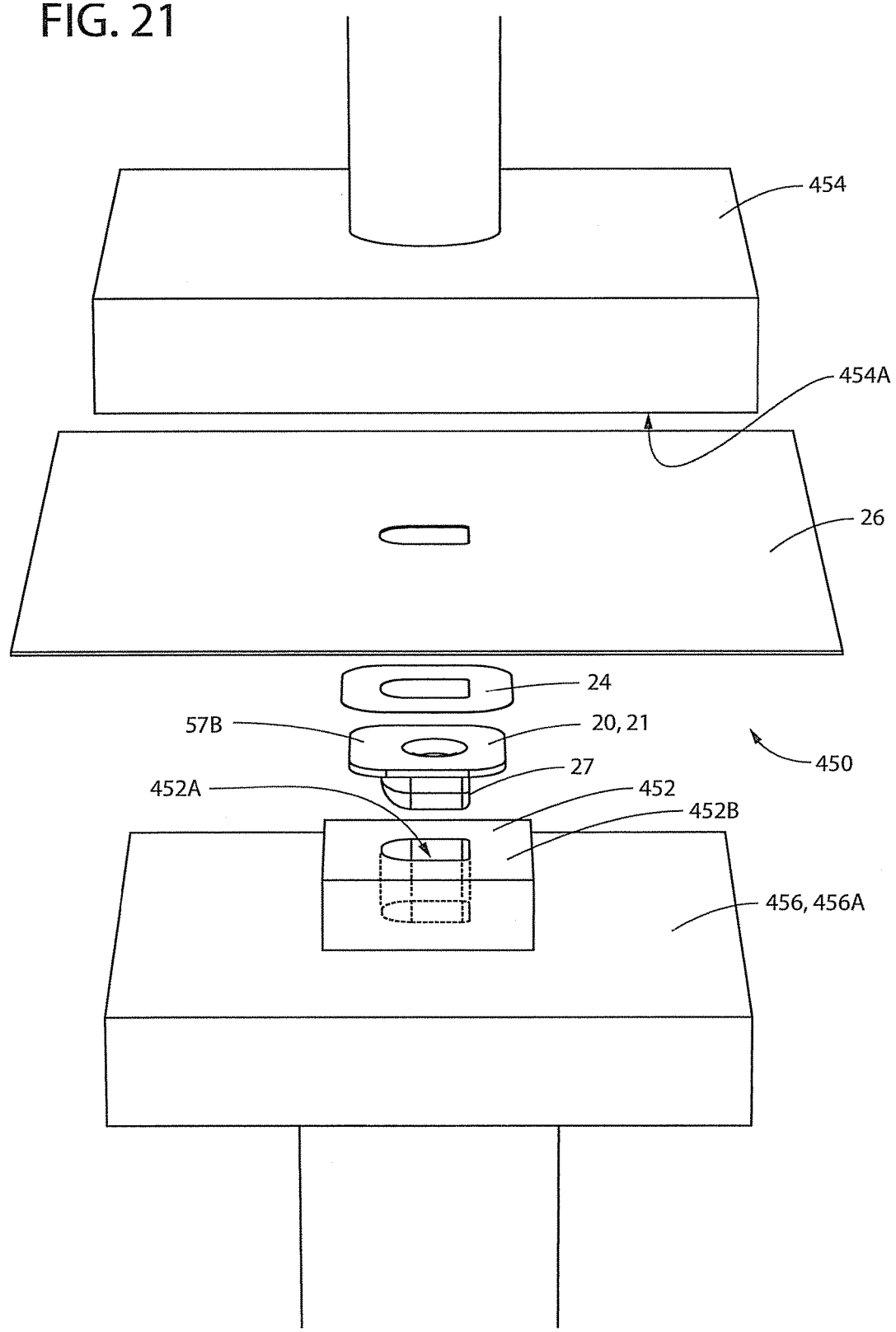
FIG. 21 shows a schematic exploded view of the use of a heat press incorporating a component retainer according to a particular embodiment suitable for use with the apparatus of FIGS. 1-3 when such apparatus is being bonded to a fabric surface in accordance with the embodiment of FIGS. 4 and 5.

FIG. 21 shows a schematic exploded view of the use of a heat press 450 incorporating a component retainer 452 according to a particular embodiment suitable for use with apparatus 20 when apparatus 20 is being bonded to fabric surface 26 in accordance with the embodiment of FIGS. 4 and 5. The FIG. 21 heat press 450 and component retainer 452 may be used in block 310 to bond adhesive surface 57B of apparatus 20 to the block 304 adhesive/fabric layers. For the purposes of explanation, FIG. 21 shows as an exploded view which depicts adhesive 24 separated from fabric 26 in a location between fabric 26 and adhesive surface 57B of apparatus 20. If heat press 450 and component retainer 452 were actually being used to implement block 310 in the order of the illustrated method 300 (FIG. 16), adhesive 24 would actually be previously bonded to fabric in block 304 to form the block 304 adhesive/fabric layers. The order of operations in the illustrated embodiment of method 300 is not necessary, however. In some embodiments, the order of various operations (e.g. blocks 304 and 310) may be interchanged.

Heat press 450 of the illustrated embodiment comprises a piston 454 having an active surface 454A and a backing element 456 having a backing surface 456A. In particular embodiments, one or both of active surface 454A of piston 454 and backing surface 456A of backing element 456 may be heated. In a currently preferred embodiment, active piston surface 454A is heated and backing surface 456A is not heated. In the FIG. 21 embodiment, component retainer 452 is mounted on backing surface 456A using any suitable mounting technique and corresponding mounting hardware (not expressly shown). Mounting component retainer 452 on backing surface 456A may also involve aligning component retainer 452 relative to active piston surface 454A. By way of non-limiting example, such mounting techniques and corresponding mounting hardware may comprise: fasteners, jigs (e.g. alignment pegs or protrusions and corresponding alignment holes or concavities, alignment edges for abutting alignment or the like), clamps or the like). In some embodiments, component retainer 452 may be placed atop backing surface 456A without mounting hardware.

In some embodiments, component retainer 452 is fabricated from a relatively heat conductive material—e.g. steel, some other suitable metallic alloy or the like. In other embodiments, component retainer 452 may be fabricated from relatively non-heat conductive (or heat retarding) materials—e.g. ceramics, wood, cementitious materials or the like. In particular embodiments, component retainer 452 comprises a plurality of regions having different thermal conductivities. Component retainer 452 of the FIG. 21 embodiment is shaped to be complementary to portions of apparatus 20. In the illustrated embodiment, component retainer 452 comprises a concavity 452A that is shaped to receive body 27 of cord lock 21A and shoulder surface 452B that is shaped to abut against adhesive surface 57A (FIG. 2) of base 22 when body 27 projects into concavity 452A. In this manner, component 21 of apparatus 20 may be placed in component retainer 452 such that adhesive surface 57B is exposed. The block 304 fabric/adhesive layers may then be aligned with adhesive surface 57B and piston 454 of heat press 450 (with a flat active surface 454A) may be brought to bear against fabric 26, adhesive 24, apparatus 20, component retainer 452 and backing element 456 to impart heat and/or pressure which causes adhesive 24 in the block 304 adhesive/fabric layers to bond to adhesive surface 57B.

FIG. 22 shows a schematic exploded view of the use of a heat press 450 incorporating a component retainer 452' according to a particular embodiment suitable for use with apparatus 20 when apparatus 20 is being bonded to fabric surface 26 in accordance with the embodiment of FIGS. 6-8. The FIG. 22 heat press 450 and component retainer 452' may be used in block 310 to bond adhesive surface 57A of apparatus 20 to the block 304 adhesive/fabric layers. For the purposes of explanation, FIG. 22 is shown as an exploded view which depicts adhesive 55 separated from fabric 26 in a location between fabric 26 and adhesive surface 57A of apparatus 20. If heat press 450 and component retainer 452' were actually being used to implement block 310 in the order of the illustrated method 300 (FIG. 16), adhesive 55 would actually be previously bonded to fabric in block 304 to form the block 304 adhesive/fabric layers. The order of operations in the illustrated embodiment of method 300 is not necessary, however. In some embodiments, the order of various operations (e.g. blocks 304 and 310) may be interchanged.

Heat press 450 of the FIG. 22 embodiment is similar to that of FIG. 21 and comprises a piston 454 having an active surface 454A and a backing element 456 having a backing surface 456A. In particular embodiments, one or both of active surface 454A of piston 454 and backing surface 456A of backing element 456 may be heated. In a currently preferred embodiment, active piston surface 454A is heated and backing surface 456A is not heated. In the FIG. 22 embodiment, component retainer 452' differs from component retainer 452 of FIG. 21 in that component retainer 452' is mounted on active piston surface 454A using any suitable mounting technique including any of those described above for component retainer 452.

Component retainer 452' of the FIG. 22 embodiment is shaped to be complementary portions of apparatus 20. In the illustrated embodiment, component retainer 452' comprises a concavity 452A' that is shaped to receive body 27 of cord lock 21A and shoulder surface 452B' that is shaped to abut against adhesive surface 57A of base 22 (FIG. 2) when body 27 projects into concavity 452A'. When component 21 of apparatus 20 is placed in component retainer 452', heat and pressure may be delivered to adhesive surface 57A and the block 304 adhesive/fabric layers to form a bond therebetween. In embodiments where piston 454 is heated and backing surface 456 is not, component retainer 452' may be fabricated from a relatively heat conductive material—e.g. steel, some other suitable metallic alloy or the like. In other embodiments, component retainer 452' may be fabricated from relatively non-heat conductive (or heat retarding) materials—e.g. ceramics, wood, cementitious materials or the like. In particular embodiments, component retainer 452 comprises a plurality of regions having different thermal conductivities. For example, one or more portions of component retainer 452' (e.g. shoulder 452B') may be relatively heat conductive to deliver heat to adhesive surface 57A and one or more portions of component retainer 452' (e.g. concavity 452A') may comprise relatively non-heat conductive (or heat retarding) materials that protect body 27 of apparatus 20 from excessive heat.

FIGS. 21 and 22 relate to apparatus 20 shown in FIGS. 1-8. It will be appreciated that where the apparatus/components being bonded have different shapes and/or features, then component retainers used with heat presses may be provided with corresponding differences. In some embodiments, portions of the component retainer(s) may be provided with heat retarding features (or features having relatively low thermal conductivities) or may be fabricated from heat retarding materials (or materials having relatively low thermal conductivities) to prevent heat from conducting, or reduce the amount of heat conducted, therethrough and to thereby prevent heat damage to components. However, in some embodiments it may be desirable for portions of the component retainer(s) to be provided with heat conducting features (or features having relatively high thermal conductivities) or to be fabricated from heat conducting materials (or materials having relatively high thermal conductivities)—e.g. in the regions of adhesive surface(s)—to allow heat to conduct therethrough and to provide the heat used to bond the adhesive to the respective adhesive surfaces. In some embodiments, both the active surface of the heat press piston and the heat press backing surface are heated. In other embodiments, heat is only applied to one of these surfaces.

Where the component being bonded is that of FIG. 10, then both backing surface 456A and piston active surface 454A may be provided with component retainers. For example, backing surface 456A may be provided with a component retainer that is complementary to the interior surface of apparatus 157 and piston active surface 454A may be provided with a component retainer that is complementary to adhesive surfaces 160A, 160B. When heat and/or pressure are applied by the piston, the adhesive in the block 304 adhesive/fabric layers is bonded to adhesive surfaces 160A, 160B. Where the component being bonded is that of FIG. 14, backing surface 456A may be provided with a component retainer that is complementary to adhesive surface 267 and piston active surface 454A may be provided with a component retainer that is complementary to adhesive surface 268. Heat and/or pressure may then be provided to both the backing surface 456A and active piston surface 454A to cause the adhesive in the block 304 adhesive/fabric regions to be bonded to adhesive surfaces 267, 268. In other embodiments, it is not necessary that both adhesive surfaces 267, 268 be mounted in one step. Such embodiments may comprise a two step process, for example, where the component retainer on active piston surface 454A is heated and the component retainer on backing surface 456A is not heated.

Where the components being bonded are plunger 412 and base 414A of apparatus 400 of FIG. 20, then the block 310 mounting process may comprise a two step process (i.e. one step for plunger 412 and one step for base 414A), where active piston surface 454A is flat and non-heated component retainers are provided on backing surface 456A which are complementary to the surfaces of plunger 412 and base 414A opposing their respective adhesive surfaces 416, 418. In cases where only one of adhesive surfaces 416, 418 is mounted, then such a two step process is not necessary.

Like block 304 described above, block 310 may optionally also involve the use of a cold press. Such a cold press may be similar in many respects to the cold press described above for block 304. Because of the presence of the component, the block 310 cold press may comprise a suitable component retainer similar to those described above for the block 310 hot press. In embodiments, the combination of heat and pressure applied by a heat press may cause the adhesive to penetrate the fibers of the fabric and to fill small imperfections or surface roughness in the adhesive surface of the component and the subsequent application of a cold press may cause the adhesive to cross-link, covalently bond, solidify or otherwise form a strong bond therebetween. In some embodiments, the cold press is applied within 1 minute of application of the heat press in block 304 to bond the adhesive to the fabric. In other embodiments, the cold press is applied within 10 seconds of application of the heat press in block 304 to bond the adhesive to the fabric. In other embodiments, the cold press is applied within 5 seconds of application of the heat press in block 304 to bond the adhesive to the fabric.

As discussed in other portions of this description, in other embodiments, there are other techniques for activating the adhesive to bond the adhesive to the adhesive surfaces of components/apparatus. Such techniques are described herein and block 310 may additionally or alternatively comprise any such techniques. In addition to any such adhesive activation techniques, block 310 may also involve application of pressure to assist the adhesive to bond to the adhesive surface(s). As discussed herein, adhesive may be provided in a variety of formats and may be applied to adhesive surfaces and/or to the fabric and/or to the block 304 fabric/adhesive layers using a variety of techniques and block 310 may comprise any such adhesive application techniques.

Method 300 may comprise optional block 308. Block 308 may involve separately bonding a layer of adhesive to the adhesive surface(s) of the component. Block 308 may be performed prior to bonding the component to the block 304 adhesive/fabric layers. Block 308 may optionally comprise the use of a heat press and a cold press. Block 308 may also involve the use of one or more component retainers on one or both of the backing surface of a heat press or the active surface of the heat press piston. Such component retainers may be similar to those described above. In embodiments which incorporate block 308, each of the adhesive layers in blocks 304 and 308 may be relatively thin in comparison to embodiments that do not incorporate block 308. In some embodiments, the procedures of blocks 304 and 308 may be performed at or around the same time and the procedure of block 310 may be commenced prior to allowing the block 304 adhesive and/or the block 308 adhesive to cool completely. Block 308 may make use of any of the above-described techniques for bonding adhesive to the adhesive surfaces of components/apparatus. Block 308 may also involve application of pressure to assist the adhesive to bond to the adhesive surface(s). As discussed above, adhesive may be provided in a variety of formats and may be applied to adhesive surfaces in block 308 using a variety of techniques and block 310 may comprise any such adhesive application techniques.

In some embodiments, block 308 may be used in the place of block 304. That is rather than bonding adhesive to the fabric first in block 304 and then bonding the block 304 fabric/adhesive layers to the component in block 310, some embodiments may involve bonding adhesive to the adhesive surface(s) of the component first in block 308 and then bonding the adhesive surface(s) of the component to the fabric in block 310.

In particular embodiments, the heat in the method 300 heat press is electrically generated (e.g. by passing current through resistive elements). In other embodiments, the heat in the method 300 heat press may be generated by passing heated fluids (e.g. hot water and/or steam) through portions of the heat press, by ultrasonic motion of portions of the heat press, by radiation-based techniques, and/or by any other suitable technique. A heat press typically transfers heat to adhesive (and potentially to other material(s) located between the piston and the backing surface) via conduction. This is not necessary. In some embodiments, where the adhesive is thermally activated, heat may be delivered to the adhesive (and possibly to other material(s)) via other techniques, such as, by way of non-limiting example, radiant heat, heat convection, heat generated by ultrasonic techniques, heat generated by RF radiation techniques or the like. Such heat transfer techniques may take place in a heat press or may be accomplished using other heat delivery apparatus. In cases where heat is transferred to the adhesive (and possibly to other material(s)) using other heat delivery apparatus, method 300 may still make use of a press which applies pressure in a manner similar to the heat press described herein. In other embodiments, the adhesive may be UV activated or chemically activated as described above. In such other embodiments, method 300 may still make use of a press which applies pressure in a manner similar to the heat press described herein.

As discussed above, sheet adhesive may initially be provided with removable backing layers. Such backing layers may be selectively removed from the sheet adhesive during the performance of method 300 to minimize the amount of adhesive that accumulates on portions of the heat press. The selective removal of backing layers may depend on the particular surfaces to which the adhesive is being bonded. For example, in block 304 it may be desirable to remove a backing layer adjacent to the fabric, but to maintain a backing layer on the opposing surface of the adhesive. As another example, where method 300 involves block 308 or when block 310 is performed before block 304, then it may be desirable to remove a backing layer adjacent to the adhesive surface of the component, but to maintain a backing layer on the opposing surface of the adhesive.

Figure 17:
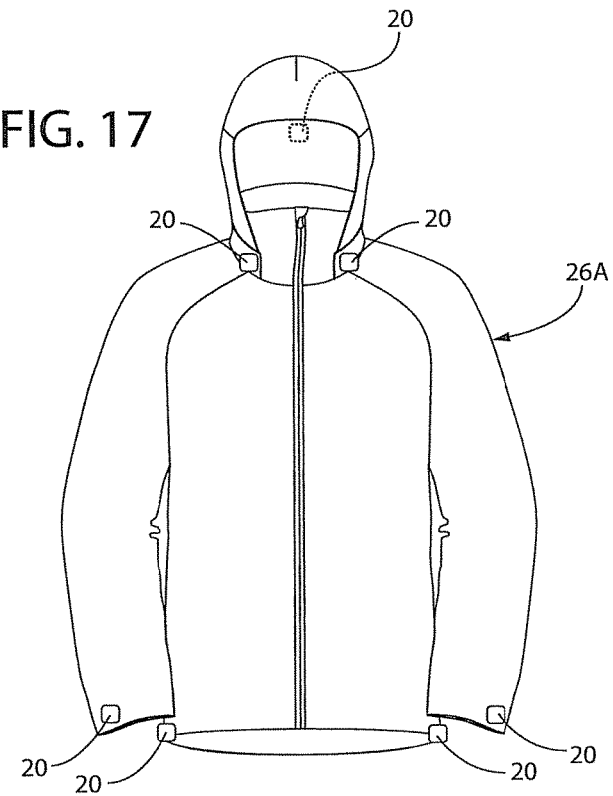
FIG. 17 illustrates a jacket incorporating a number of apparatus according to a particular embodiment of the invention.
Figure 18:
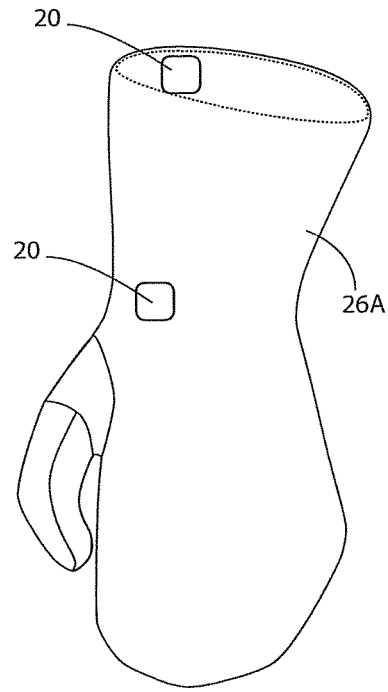
FIG. 18 illustrates a glove incorporating a number of apparatus according to a particular embodiment of the invention.
Figure 19:
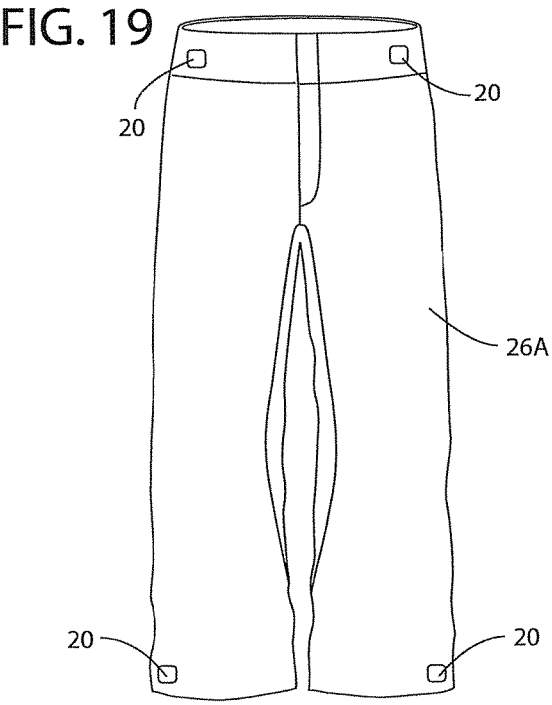
FIG. 19 illustrates a pair of outer pants incorporating a number of apparatus according to a particular embodiment of the invention.

FIG. 17 depicts a number of apparatus 20 of the type described above applied to a garment 26A, in accordance with a particular embodiment. In the FIG. 17 embodiment, garment 26A is a jacket and apparatus 20 may comprise the type shown in FIGS. 1-3 which may be affixed to garment 26A in the manner described above in connection with FIGS. 4 and 5 or in connection with FIGS. 6-8. In other embodiments, jacket 26A may be provided with apparatus similar to the other apparatus described or referred to herein. FIG. 18 depicts a number of apparatus 20 of the type described above applied to a different garment 26A (i.e. a glove). FIG. 19 depicts a number of apparatus 20 of the type described above applied to a different garment 26A (i.e. a pair of pants). The garments to which devices of the type described herein are not limited to jackets, gloves or pants. In other embodiments, garments which incorporate apparatus according to the invention and which are fabricated in accordance with the methods of the invention may comprise jackets, sweaters, thermal clothing, gloves, mitts, inner and/or outer pants, gaiters and the like.

Variations and modifications of the foregoing are within the scope of the present invention. It is understood that the invention disclosed and defined herein extends to all the alternative combinations of two or more of the individual features mentioned or evident from the text and/or drawings. All of these different combinations constitute various alternative aspects of the present invention. The embodiments described herein explain the best modes known for practicing the invention. Aspects of the invention are to be construed to include alternative embodiments to the extent permitted by the prior art. For example:

In some of the embodiments described above, the base or base plate is described as being fabricated from a material that comprises, or is based on, a polymer or group of polymers that is the same as the polymer or group of polymers that make-up, or form the basis of, the adhesive used to bond the apparatus to the fabric of a garment. In other embodiments, the base or base plate or, more particularly, the adhesive surface(s) of the base or base plate, may be coated with a material that comprises, or is based on, a polymer or group of polymers that is the same as the polymer or group of polymers that make-up, or form the basis of, the adhesive. In still other embodiments, adhesive surface (s) may be coated with or fabricated from a material that is complimentary to the material of the adhesive, such that under suitable conditions (e.g. suitable temperature and/or pressure and/or photo-excitation conditions) the complementary materials in the adhesive and on the adhesive surface will cross-link, chemically bond, solidify or otherwise form a strong bond to one another. In still other embodiments, adhesive surface(s) may be coated with or fabricated from a catalyst material that accelerates a reaction between complementary materials contained in the adhesive, such that under suitable conditions (e.g. suitable temperature and/or pressure and/or photo-excitation conditions) the complementary materials in the adhesive will cross-link, chemically bond, solidify or otherwise form a strong bond to one another.

In some embodiments, liquid adhesive may be used in the place of the adhesive sheets described herein. In such embodiments, the liquid adhesive may be applied to adhesive surfaces and or to corresponding regions of fabric and then pressure may be applied (e.g. in a press similar to the above-described heat presses) until the adhesive cures.

In the embodiments described herein, adhesive is described as curing by solidifying after the application of heat. This is not necessary. In other embodiments, adhesives may be cured by other methods, such as, by way of non-limiting example, UV curing, chemical curing (e.g. addition of a suitable reactant or catalyst), or the like.

As discussed above in connection with the embodiment of FIGS. 1-8, adhesive surfaces 57A, 57B may be provided with a roughened texture having a roughness on the order of 1%-10% of the thickness (t) of base plate 22 which can improve the bonding between adhesive surfaces 57A, 57B and fabric 26 of garment 26A. The adhesive surfaces of other embodiments, including any of the other embodiments described herein, may comprise similarly roughened textures with thicknesses on the order of 1%-10$ of the thickness (t) of the structure that provides the adhesive surface. Such adhesive surface textures may in a range of SP1-C3 to MT-11070.

As discussed above in connection with the embodiment of FIGS. 1-8, adhesive surfaces 57A, 57B may be generally flat or relatively smooth (i.e. with non-abrupt curvature). The adhesive surfaces of other embodiments, including any of the other embodiments described herein, may be generally flat or relatively smooth (i.e. with non-abrupt curvature). For example, in some embodiments, such adhesive surfaces may comprise curvatures having radii of curvature greater than or equal to 15 mm. In some embodiments, these radii of curvature may be greater than or equal to 25 mm.

What is claimed is:

1. A method for attaching a hardware component to a garment, the method comprising:
   providing a garment comprising a layer of fabric;
   providing the hardware component with an operative component and an adhesive surface;
   bonding the adhesive surface to a corresponding interior surface of the fabric layer using an adhesive located between the adhesive surface and the corresponding interior surface of the fabric layer;
   wherein bonding the adhesive surface to the corresponding interior surface of the fabric layer comprises:
      using a heat press to apply heat to the fabric layer, the adhesive and the adhesive surface and to apply pressure that tends to force the fabric layer and the adhesive surface toward one another;
      projecting the hardware component from an interior of the fabric layer, through an aperture defined by the fabric layer, and to an exterior of the fabric layer;
      first bonding the adhesive to the fabric layer to provide a combination of the adhesive and the fabric layer; and
      subsequently bonding the combination of the adhesive and the fabric layer to the adhesive surface;
   wherein first bonding the adhesive to the fabric layer comprises first using the heat press to apply heat to the fabric layer and the adhesive and to apply pressure that tends to force the fabric layer and the adhesive toward one another;
   wherein subsequently bonding the combination of the adhesive and the fabric layer to the adhesive surface comprises subsequently using the heat press to apply heat to the combination of the adhesive and the fabric layer and the adhesive surface and to apply pressure that tends to force the combination of the adhesive and the fabric layer and the adhesive surface toward one another;
   wherein first using the heat press to apply heat and pressure comprises:
      providing a piston having an active surface and a backing surface;
      locating the fabric layer and the adhesive between the active piston surface and the backing surface; and
      effecting relative movement between the piston and the backing surface to bring the piston and the backing surface closer to one another and to thereby apply heat to the fabric layer and the adhesive and pressure that tends to force the fabric layer and the adhesive toward one another; and
   wherein subsequently using the heat press to apply heat and pressure comprises:
      mounting a component retainer to the active piston surface or to the backing surface, the component retainer having a shape complementary to at least a portion of hardware component for receiving the portion of the hardware component in an abutting relationship;
      locating the combination of the adhesive and the fabric layer and the hardware component between the active piston surface and the backing surface such that the portion of the hardware component is received by the component retainer in an abutting relationship; and
      effecting relative movement between the piston and the backing surface to bring the piston and backing surface closer to one another and to thereby apply heat to the combination of the adhesive and the fabric layer and the adhesive surface and pressure that tends to force the combination of the adhesive and the fabric layer and the adhesive surface toward one another.

2. A method according to claim 1 wherein the component retainer is fabricated from a material having a thermal conductivity that is low in comparison to that of the active piston surface.

3. A method according to claim 1 wherein the component retainer comprises a plurality of regions, each region having a different thermal conductivity.

4. A method according to claim 1 wherein the heat in the heat press is generated by one or more of: electric heat generation; passing a heated fluid through portions of the heat press; ultrasonic motion of portions of the heat press; and electromagnetic radiation.

5. A method according to claim 1 wherein the adhesive surface comprises a polymer that is the same as a polymer that forms a basis of the adhesive.

6. A method according to claim 1 comprising applying to the adhesive surface a coating material comprising a polymer that is the same as a polymer that forms a basis of the adhesive.

7. A method according to claim 1 wherein the adhesive surface comprises a first polymer that cross-links with a second polymer that forms a basis of the adhesive and wherein bonding the adhesive surface to the corresponding interior surface of the fabric layer comprises supplying energy to facilitate a cross-linking reaction between the first and second polymers.

8. A method according to claim 1 comprising applying to the adhesive surface a coating material comprising a first polymer that cross-links with a second polymer that forms a basis of the adhesive and wherein bonding the adhesive surface to the corresponding interior surface of the fabric layer comprises supplying energy to facilitate a cross-linking reaction between the first and second polymers.

9. A method according to claim 1 wherein bonding the adhesive surface to the corresponding interior surface of the fabric layer comprises forming a bond between the adhesive and the adhesive surface having one or more of: a shear strength greater than or equal to equal to 2N/mm2; and a peel strength greater than or equal to equal to 0.33N/mm.

10. A method according to claim 1 wherein bonding the adhesive surface to the corresponding interior surface of the fabric layer comprises providing the adhesive in a location between the adhesive surface and the corresponding interior surface of the fabric layer such that a perimeter of the adhesive extends transversely beyond a perimeter edge of the adhesive surface by an amount greater than or equal to 0.25 mm.

11. A method according to claim 1 wherein bonding the adhesive surface to the corresponding interior surface of the fabric layer comprises providing the adhesive in a location between the adhesive surface such that when bonded, the adhesive encapsulates at least a corner of a perimeter edge of the adhesive surface that is adjacent to the fabric.

12. A method according to claim 1 wherein the adhesive surface extends in transverse directions by an amount that is relatively large in comparison to a transverse extension of the operative component and a ratio of the transverse extension of the adhesive surface to the transverse extension of the operative component in one or more particular directions is greater than or equal to 1.4.

13. A method according to claim 1 wherein the adhesive surface is provided on a base of the hardware component and the method comprises fabricating the adhesive surface to have a roughness in a range of 1%-10% of a maximum thickness of the base.

14. A method according to claim 1 comprising injection molding the hardware component to provide the adhesive surface with a texture in a range of SPI-C3 to MT-11070.

15. A method according to claim 1 comprising fabricating the adhesive surface such that all corners have radii of curvature greater than or equal to 2 mm.

16. A method according to claim 1 wherein the adhesive surface is provided on a base of the hardware component and a thickness of the base is relatively thin on its perimeter edge and relatively thick at one or more locations spaced apart from its perimeter edge.

17. A method according to claim 16 wherein a ratio of the thickness of a thickest section of the base to the perimeter edge of the base is greater than or equal to 2.

18. A method according to claim 16 wherein the thickness of a thickest section of the base is greater than or equal to 1 mm and the thickness of the perimeter edge of the base is less than or equal to 0.5 mm.

19. A method according claim 1 wherein the adhesive surface is provided on a base of the hardware component and a flexibility of the base is relatively flexible on its perimeter edge and relatively rigid at one or more locations spaced apart from its perimeter edge.

20. A method according to claim 1 wherein the operative component of the hardware component comprises one or more movable parts.

21. A method according to claim 1 wherein the hardware component comprises one or more non-integrally formed components.

22. A method according to claim 1 wherein the adhesive surface of the hardware component is coated with a catalyst material that accelerates bonding between the adhesive surface and the adhesive.

* * * * *